US011736976B2

(12) United States Patent
Ohta

(10) Patent No.: US 11,736,976 B2
(45) Date of Patent: Aug. 22, 2023

(54) WIRELESS COMMUNICATION SYSTEM, BASE STATION, USER EQUIPMENT, AND WIRELESS COMMUNICATION METHOD

(71) Applicant: FUJITSU LIMITED, Kawasaki (JP)

(72) Inventor: Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/852,821

(22) Filed: Apr. 20, 2020

(65) Prior Publication Data

US 2020/0252829 A1 Aug. 6, 2020

Related U.S. Application Data

(63) Continuation of application No. PCT/JP2017/038583, filed on Oct. 25, 2017.

(51) Int. Cl.
*H04W 28/04* (2009.01)
*H04W 76/15* (2018.01)
*H04W 92/20* (2009.01)

(52) U.S. Cl.
CPC ........... *H04W 28/04* (2013.01); *H04W 76/15* (2018.02); *H04W 92/20* (2013.01)

(58) Field of Classification Search
CPC ...... H04W 28/04; H04W 92/20; H04W 76/15
See application file for complete search history.

(56) References Cited

U.S. PATENT DOCUMENTS

| 7,359,327 | B2 * | 4/2008 | Oshiba | H04L 1/20 370/465 |
| 8,295,162 | B2 * | 10/2012 | Soon | A61B 17/7064 370/225 |
| 8,472,943 | B1 * | 6/2013 | Shah | H04L 1/203 370/332 |
| 10,911,185 | B2 * | 2/2021 | Matsuo | H04L 5/0037 |

(Continued)

FOREIGN PATENT DOCUMENTS

EP 3 038 408 A1 6/2016
JP 2015-177509 A 10/2015
(Continued)

OTHER PUBLICATIONS

International Search Report issued by the Japan Patent Office for corresponding International Patent Application No. PCT/JP2017/038583, dated Dec. 26, 2017, with an English translation.
(Continued)

*Primary Examiner* — Parth Patel
(74) *Attorney, Agent, or Firm* — Myers Wolin, LLC

(57) ABSTRACT

A wireless communication system includes a first wireless communication device, and a second wireless communication device. The first wireless communication device includes: a communicator that delivers, to the second wireless communication device, data addressed to a third wireless communication device and receives, from the second wireless communication device, information on communication quality according to failed data of which delivery fails among the data delivered from the second wireless commu- (Continued)

nication device to the third wireless communication device; and a controller that controls delivery of the data in accordance with the information on the communication quality.

9 Claims, 14 Drawing Sheets

(56) References Cited

U.S. PATENT DOCUMENTS

| | | | | |
|---|---|---|---|---|
| 2008/0045217 | A1* | 2/2008 | Kojima | H04W 56/0045 455/436 |
| 2008/0279155 | A1* | 11/2008 | Pratt, Jr. | H04W 72/0446 370/336 |
| 2010/0027520 | A1* | 2/2010 | Yao | H04L 1/1816 370/338 |
| 2012/0093004 | A1* | 4/2012 | Nishi | H04L 41/0631 370/242 |
| 2013/0166982 | A1* | 6/2013 | Zheng | H04L 1/18 714/748 |
| 2013/0198570 | A1* | 8/2013 | Nishi | H04L 41/0672 714/33 |
| 2016/0337254 | A1* | 11/2016 | Karaki | H04W 28/08 |
| 2017/0367052 | A1* | 12/2017 | Kil | H04W 52/221 |
| 2018/0006957 | A1* | 1/2018 | Ouyang | H04L 43/08 |
| 2018/0220470 | A1* | 8/2018 | Zacharias | H04W 36/0069 |
| 2018/0332496 | A1* | 11/2018 | Dudda | H04W 28/08 |
| 2019/0059034 | A1* | 2/2019 | Feng | H04W 36/38 |
| 2019/0190657 | A1* | 6/2019 | Sun | H04L 1/1858 |
| 2019/0327607 | A1* | 10/2019 | Xiao | H04W 76/15 |
| 2020/0252829 | A1* | 8/2020 | Ohta | H04W 28/04 |
| 2020/0359356 | A1* | 11/2020 | Sirotkin | H04W 80/08 |
| 2021/0153070 | A1* | 5/2021 | Velev | H04W 28/0268 |

FOREIGN PATENT DOCUMENTS

| | | | | |
|---|---|---|---|---|
| JP | 2017-175440 | A | 9/2017 | |
| WO | 2010/090179 | A1 | 8/2010 | |
| WO | 2015/025846 | A1 | 2/2015 | |
| WO | WO-2015141012 | A1 * | 9/2015 | H01L 24/745 |
| WO | 2018/237001 | A1 | 12/2018 | |

OTHER PUBLICATIONS

Extended European search report with supplementary European search report and the European search opinion issued by the European Patent Office for corresponding European Patent Application No. 17930122.1-1212, dated Sep. 2, 2020.
Huawei, "Downlink Flow control for EN-DC", Agenda Item: 10.8. 3.1, 3GPP TSG-RAN WG3 Meeting #97, R3-173188, Berlin, Germany, Aug. 21-25, 2017.
Zte, Change Request for "Introduction of EN-DC in 36.425", 36.425 CR 009 rev 3 Current version: 14.0.0, 3GPP TSG-RAN WG3#Ad-hoc , R3-172052, Qindao, China, Jun. 27-29, 2017.
Notice of Reasons for Refusal issued by the Japan Patent Office for corresponding Japanese Patent Application No. 2019-549758, dated Mar. 23, 2021, with an English translation.
3GPP TS 36.300 V14.3.0, "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 14)", Jun. 2017.
3GPP TS 36.211 V14.3.0, "3rd Generation Partnership Project; Technical Specification Group Radio Access Network Evolved Universal Terrestrial Radio Access (E-UTRA); Physical channels and modulation (Release 14)", Jun. 2017.
3GPP TS 36.212 V14.3.0, "3rd Generation Partnership Project; Technical Specification Group Radio Access Network Evolved Universal Terrestrial Radio Access (E-UTRA); Multiplexing and channel coding (Release 14)", Jun. 2017.
3GPP TS 36.213 V14.3.0, "3rd Generation Partnership Project; Technical Specification Group Radio Access Network Evolved Universal Terrestrial Radio Access (E-UTRA); Physical layer procedures (Release 14)", Jun. 2017.
3GPP TS 36.214 V14.2.0, "3rd Generation Partnership Project; Technical Specification Group Radio Access Network Evolved Universal Terrestrial Radio Access (E-UTRA); Physical layer; Measurements (Release 14)", Mar. 2017.
3GPP TS 36.321 V14.3.0, "3rd Generation Partnership Project; Technical Specification Group Radio Access Network Evolved Universal Terrestrial Radio Access (E-UTRA); Medium Access Control (MAC) protocol specification (Release 14)", Jun. 2017.
3GPP TS 36.322 V14.0.0, "3rd Generation Partnership Project; Technical Specification Group Radio Access Network Evolved Universal Terrestrial Radio Access (E-UTRA); Radio Link Control (RLC) protocol specification (Release 14)", Mar. 2017.
3GPP TS 36.323 V14.3.0, "3rd Generation Partnership Project; Technical Specification Group Radio Access Network Evolved Universal Terrestrial Radio Access (E-UTRA); Packet Data Convergence Protocol (PDCP) specification Release 14)", Jun. 2017.
3GPP TS 36.331 V14.3.0, "3rd Generation Partnership Project; Technical Specification Group Radio Access Network Evolved Universal Terrestrial Radio Access (E-UTRA); Radio Resource Control (RRC); Protocol specification (Release 14)", Jun. 2017.
3GPP TS 36.413 V14.3.0, "3rd Generation Partnership Project; Technical Specification Group Radio Access Network Evolved Universal Terrestrial Radio Access Network (E-UTRAN); S1 Application Protocol (S1AP) (Release 14)", Jun. 2017.
3GPP TS 36.423 V14.3.0, "3rd Generation Partnership Project; Technical Specification Group Radio Access Network Evolved Universal Terrestrial Radio Access Network (E-UTRAN); X2 application protocol (X2AP) (Release 14)", Jun. 2017.
3GPP TS 36.425 V14.0.0, "3rd Generation Partnership Project; Technical Specification Group Radio Access Network Evolved Universal Terrestrial Radio Access Network (E-UTRAN); X2 interface user plane protocol (Release 14)", Mar. 2017.
3GPP TR 36.912 V14.0.0, "3rd Generation Partnership Project; Technical Specification Group Radio Access Network Study on New Radio (NR) access technology (Release 14)", Mar. 2017.
3GPP TR 38.912 V14.1.0, "3rd Generation Partnership Project; Technical Specification Group Radio Access Network Study on New Radio (NR) access technology (Release 14)", Jun. 2017.
3GPP TR 38.913 V14.3.0, "3rd Generation Partnership Project; Technical Specification Group Radio Access Network Study on Scenarios and Requirements for Next Generation Access Technologies; (Release 14)", Jun. 2017.
3GPP TR 38.801 V14.0.0, "3rd Generation Partnership Project; Technical Specification Group Radio Access Network Study on new radio access technology: Radio access architecture and interfaces (Release 14)", Mar. 2017.
3GPP TR 38.802 V14.1.0, "3rd Generation Partnership Project; Technical Specification Group Radio Access Network Study on New Radio Access Technology Physical Layer Aspects (Release 14)", Jun. 2017.
3GPP TR 38.803 V14.1.0, "3rd Generation Partnership Project; Technical Specification Group Radio Access Network Study on new radio access technology: Radio Frequency (RF) and co-existence aspects (Release 14)", Jun. 2017.
3GPP TR 38.804 V14.0.0, "3rd Generation Partnership Project; Technical Specification Group Radio Access Network Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network Study on channel model for frequency spectrum above 6 GHz (Release 14)", Jul. 2017.
3GPP TS 38.300 V0.6.0, "3rd Generation Partnership Project; Technical Specification Group Radio Access Network NR; NR and NG-RAN Overall Description; Stage 2 (Release 15)", Aug. 2017.
3GPP TS 37.340 V0.2.1, "3rd Generation Partnership Project; Technical Specification Group Radio Access Network Evolved Universal Terrestrial Radio Access (E-UTRA) and NR; Multi-connectivity; Stage 2 (Release 15)", Aug. 2017.

(56) References Cited

OTHER PUBLICATIONS

3GPP TS 38.201 V0.0.1, "3rd Generation Partnership Project; Technical Specification Group Radio Access Network; NR; Physical layer; General description (Release 15)", Jul. 2017.
3GPP TS 38.202 V0.0.1, "3rd Generation Partnership Project; Technical Specification Group Radio Access Network; NR; Services provided by the physical layer (Release 15)", Jul. 2017.
3GPP TS 38.211 V0.1.3, 3rd Generation Partnership Project; Technical Specification Group Radio Access Network; NR; Physical channels and modulation (Release 15), Aug. 2017.
3GPP TS 38.212 V0.0.2, "3rd Generation Partnership Project; Technical Specification Group Radio Access Network; NR; Multiplexing and channel coding (Release 15)", Aug. 2017.
3GPP TS 38.213 V0.0.3, "Technical Specification 3rd Generation Partnership Project; Technical Specification Group Radio Access Network; NR; Physical layer procedures for control (Release 15)", Aug. 2017.
3GPP TS 38.214 V0.0.1, "3rd Generation Partnership Project; Technical Specification Group Radio Access Network; NR; Physical layer procedures for data (Release 15)", Jul. 2017.
3GPP TS 38.215 V0.0.2, "3rd Generation Partnership Project; Technical Specification Group Radio Access Network; NR; Physical layer measurements (Release 15)", Aug. 2017.
3GPP TS 38.321 V0.2.0, "3rd Generation Partnership Project; Technical Specification Group Radio Access Network; NR; Medium Access Control (MAC) protocol specification (Release 15)", Aug. 2017.
3GPP TS 38.322 V0.2.0, 3rd Generation Partnership Project; Technical Specification Group Radio Access Network; NR; Radio Link Control (RLC) protocol specification (Release 15), Jul. 2017.
3GPP TS 38.323 V0.2.1, "3rd Generation Partnership Project; Technical Specification Group Radio Access Network; NR; Packet Data Convergence Protocol (PDCP) specification (Release 15)", Aug. 2017.
3GPP TS 37.324 V0.1.1 "3rd Generation Partnership Project; Technical Specification Group Radio Access Network; E-UTRA and NR; Service Data Adaptation Protocol (SDAP) specification (Release 15)", Aug. 2017.
3GPP TS 38.331 V0.0.5, "3rd Generation Partnership Project; Technical Specification Group Radio Access Network; NR; Radio Resource Control (RRC); Protocol specification (Release 15)", Aug. 2017.
3GPP TS 38.401 V0.2.0, "3rd Generation Partnership Project; Technical Specification Group Radio Access Network; NG-RAN; Architecture description (Release 15)", Jul. 2017.
3GPP TS 38.410 V0.3.0, "3rd Generation Partnership Project; Technical Specification Group Radio Access Network; NG-RAN; NG general aspect and principles (FFS) (Release 15)", Jul. 2017.
3GPP TS 38.413 V0.2.1, "3rd Generation Partnership Project; Technical Specification Group Radio Access Network; NG Radio Access Network (NG-RAN); NG Application Protocol (NGAP) (Release 15)", Aug. 2017.
3GPP TS 38.420 V0.2.0, "3rd Generation Partnership Project; Technical Specification Group Radio Access Network; NG-RAN; Xn general aspects and principles (Release 15)", Jul. 2017.
3GPP TS 38.423 V0.1.1, "3rd Generation Partnership Project; Technical Specification Group Radio Access Network; NG Radio Access Network (NG-RAN); Xn application protocol (XnAP) (Release 15)", Jun. 2017.
3GPP TS 38.470 V0.2.0, "3rd Generation Partnership Project; Technical Specification Group Radio Access Network; NG-RAN; F1 general aspects and principles (Release 15)", Jun. 2017.
3GPP TS 38.473 V0.2.0, "3rd Generation Partnership Project; Technical Specification Group Radio Access Network; NG-RAN; F1 application protocol (F1AP) (Release 15)", Jun. 2017.
Notice of Reasons for Refusal issued by the Japan Patent Office for corresponding Japanese Patent Application No. 2019-549758, dated Oct. 12, 2021, with an English translation.
Communication pursuant to Article 94(3) EPC issued by the European Patent Office for corresponding European application No. 17 930 122.1-1212, dated Mar. 28, 2022.
First Notification of Office Action and Search Report issued by the China National Intellectual Property Administration for corresponding Chinese Patent Application No. 201780096173.X, dated Jan. 6, 2023, with an English translation.
Notice of Reasons for Refusal issued by the Japan Patent Office for corresponding Japanese Patent Application No. 2022-094021, dated May 30, 2023, with an English translation.

* cited by examiner

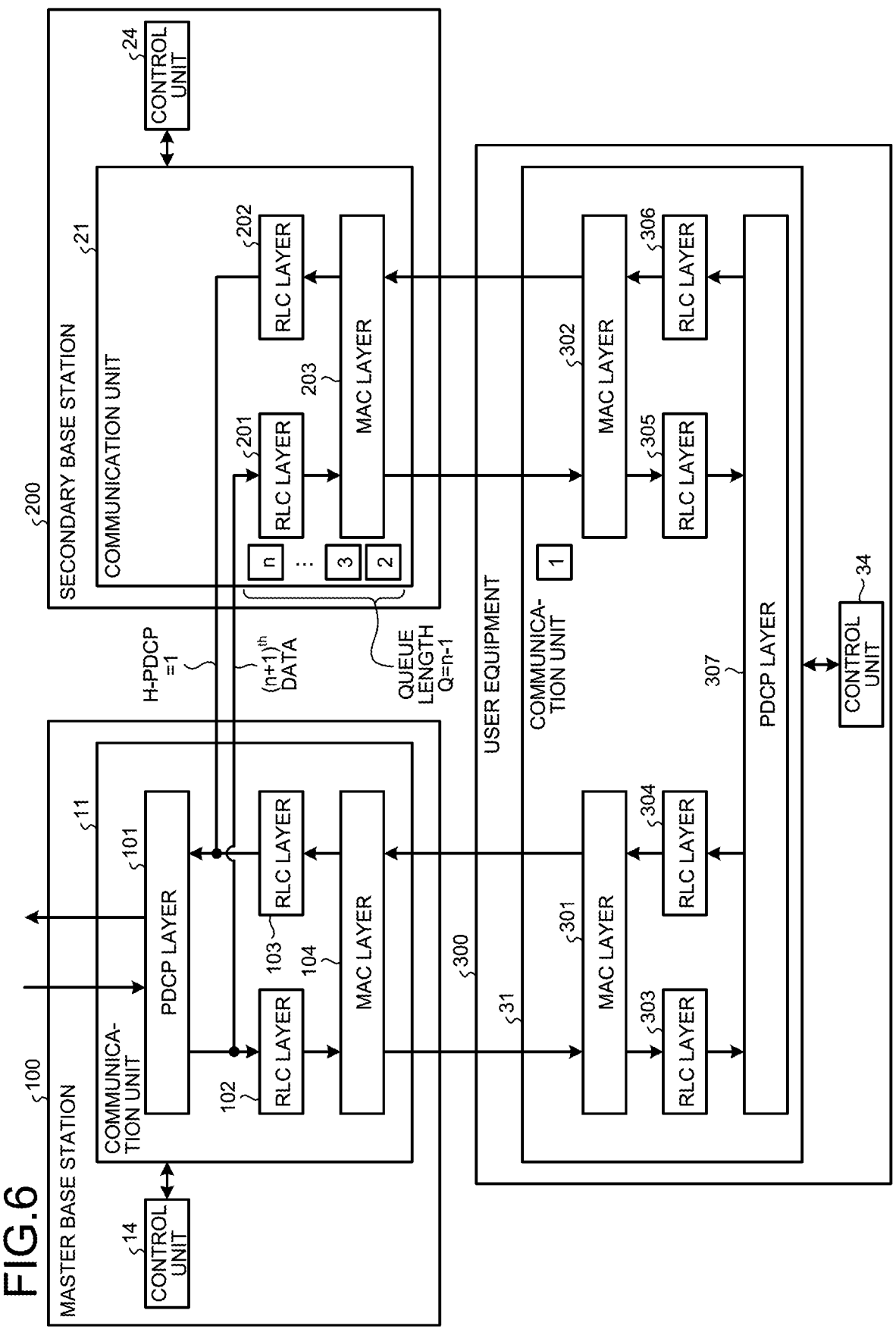

FIG.7

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Spare | | Final Frame Ind. | Lost Packet Report | 1 |
| Highest successfully delivered PDCP Sequence Number | | | | | | | | 2 |
| Desired buffer size for the E-RAB | | | | | | | | 4 |
| Minimum desired buffer size for the UE | | | | | | | | 4 |
| Number of lost X2-U Sequence Number ranges reported | | | | | | | | 1 |
| Start of lost X2-U Sequence Number range | | | | | | | | 4*(Number of reported lost X2-U SN ranges) |
| End of lost X2-U Sequence Number range | | | | | | | | |
| Spare extension | | | | | | | | 0-4 |

FIG.8

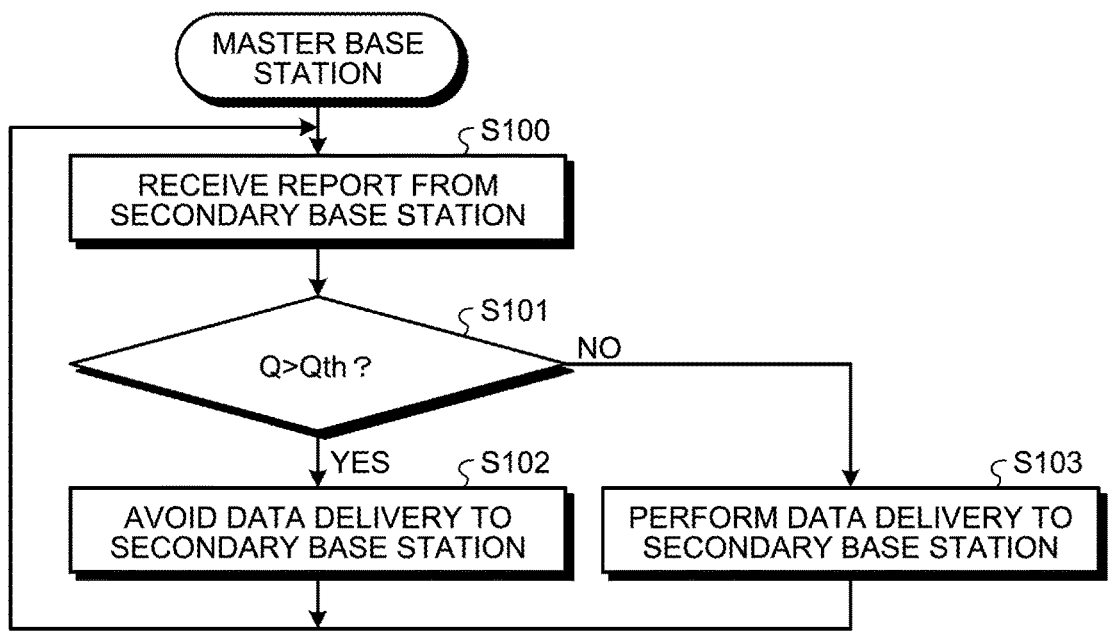

FIG.11

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Spare | | Final Frame Ind. | Lost Packet Report | 1 |
| Rate of failed delivered PDCP Sequence Number | | | | | | | | 2 |
| Desired buffer size for the E-RAB | | | | | | | | 4 |
| Minimum desired buffer size for the UE | | | | | | | | 4 |
| Number of lost X2-U Sequence Number ranges reported | | | | | | | | 1 |
| Start of lost X2-U Sequence Number range | | | | | | | | 4*(Number of reported lost X2-U SN ranges) |
| End of lost X2-U Sequence Number range | | | | | | | | |
| Spare extension | | | | | | | | 0-4 |

FIG.12

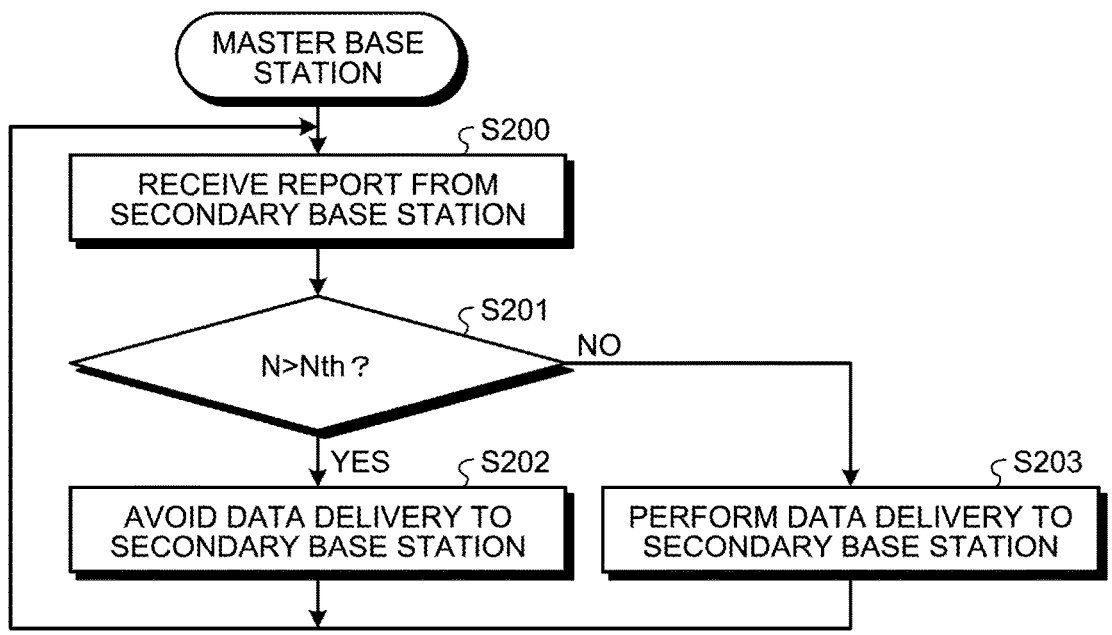

FIG.14

| Bits | | | | | | | |
|---|---|---|---|---|---|---|---|
| 7 | 6 | 5 | 4 | 3 | 2 | 1 | 0 |
| F-PDCP SN (ERROR RATE) ||||||||
| RESOURCE UTILIZATION RATE ||||||||

FIG.15

| Bits | | | | | | | |
|---|---|---|---|---|---|---|---|
| 7 | 6 | 5 | 4 | 3 | 2 | 1 | 0 |
| F-PDCP SN (ERROR RATE) ||||||||
| DELAY TIME ||||||||

FIG.16

| Bits | | | | | | | |
|---|---|---|---|---|---|---|---|
| 7 | 6 | 5 | 4 | 3 | 2 | 1 | 0 |
| F-PDCP SN (ERROR RATE) ||||||||
| RESOURCE UTILIZATION RATE ||||||||
| DELAY TIME ||||||||

FIG.17

| Bits | | | | | | | |
|---|---|---|---|---|---|---|---|
| 7 | 6 | 5 | 4 | 3 | 2 | 1 | 0 |
| F-PDCP SN (ERROR RATE) ||||||||
| RESOURCE UTILIZATION RATE ||||||||
| DELAY TIME ||||||||
| DATA RETENTION AMOUNT OF ENTIRE UE ||||||||

WIRELESS COMMUNICATION SYSTEM, BASE STATION, USER EQUIPMENT, AND WIRELESS COMMUNICATION METHOD

CROSS-REFERENCE TO RELATED APPLICATION

This application is a continuation of International Application No. PCT/JP2017/038583, filed on Oct. 25, 2017 and designating the U.S., the entire contents of which are incorporated herein by reference.

FIELD

The present invention relates to a wireless communication system, a base station, a user equipment, and a wireless communication method.

BACKGROUND

In the related art, various efforts have been made in order to increase a transmission capacity (hereinafter, referred to as a "system capacity") in a wireless communication system. For example, in 3rd generation partnership project radio access network long term evolution (3GPP LTE), discussions are being made on a technology for increasing the system capacity by utilizing a small cell in addition to a macro cell. The cell herein refers to a range covered by a radio base station in order for a radio terminal to transmit/receive a radio signal. Since the concepts of the radio base station and the cell approximately correspond to each other, the "cell" and the "radio base station" may be read interchangeably, when appropriate, in the following description. The macro cell is a cell of a base station in which transmission power is relatively high and a radio wave coverage is relatively wide. Furthermore, the small cell is a cell of a base station in which transmission power is relatively low and a radio wave coverage is relatively narrow.

In 3GPP LTE-Advanced (LTE-A), for example, as a configuration of a wireless communication system, a configuration in which a macro cell includes a plurality of small cells has been studied. Furthermore, a technology for simultaneously connecting a user equipment to a macro cell and a small cell has been studied. In addition, a technology for simultaneously connecting the user equipment to two different small cells has been studied. As described above, communication performed by the user equipment simultaneously connected to two different cells may be referred to as dual connectivity (hereinafter, referred to as "DC"). Although the DC will be described below, the same discussion can be applied to multi-connectivity, which is triple or more. Therefore, in the following description, the DC may be considered as a concept including the multi-connectivity, or may also be read as the multi-connectivity.

Furthermore, also in next generation communication standards (for example, the 5th generation mobile communication system (5G) or new radio (NR)), the DC is considered as one configuration in a wireless communication system. Particularly, the DC in LTE-A or 5G is called Multi-RAT DC. Configurations corresponding to the next generation communication standards are also expected to be discussed.

When the user equipment is simultaneously connected to the macro cell and the small cell, for example, a signal of a control plane including Layer 3 control information, such as transmission path setting and handover control, is transmitted/received to/from a base station of the macro cell (hereinafter, referred to as a "macro base station"). Furthermore, for example, a signal of a data plane including user data is transmitted/received to/from both the macro base station and a base station of the small cell (hereinafter, referred to as a "small base station"). The control plane may be referred to as a control plane (C-plane), a signaling radio bearer (SRB), or the like. Furthermore, the data plane may be referred to as a user plane (U-plane), a data radio bearer (DRB), or the like.

On the other hand, when the user equipment is simultaneously connected to two different small cells, for example, the signal of the control plane is transmitted/received to/from one small base station, and the signal of the data plane is transmitted/received to/from the other small base station. The signal of the data plane may be transmitted/received to/from both of the small base stations.

In such a DC, a base station to which the control plane is connected may be referred to as a "primary base station". Furthermore, a base station that communicates in cooperation with the primary base station and that the data plane is connected to may be referred to as a "secondary base station". Furthermore, these base stations may also be referred to as an anchor radio base station and an assisting radio base station, or a master radio base station and a slave radio base station. Note that in the latest trend of LTE-A, these base stations are referred to as a "master base station" and a "secondary base station", respectively.

Regarding function sharing between the master base station and the secondary base station in the DC, various configurations have been proposed depending on which layer is used to split the signal of the data plane. For example, there is a configuration in which the signal of the data plane is split at a prior stage of a packet data convergence protocol (PDCP) layer. Furthermore, for example, there is a configuration in which the signal of the data plane is split between the PDCP layer and a radio link control (RLC) layer. Furthermore, for example, there is a configuration in which the signal of the data plane is split between the RLC layer and a medium access control (MAC) layer. Without being limited thereto, a configuration in which the signal of the data plane is split in each layer is also possible. Furthermore, for example, a configuration in which some functions of the PDCP layer are assigned to the master base station and the remaining functions of the PDCP layer are assigned to the secondary base station is also possible. This is also the same for the functions of the RLC layer and the MAC layer.

The master base station and the secondary base station sharing the functions as described above are connected to each other by a wired or wireless link. Then, the signal of the data plane split at the master base station is transmitted to the secondary base station via the link.

Non-Patent Literature 1: 3GPP TS36. 300 V14.3.0, June 2017
Non-Patent Literature 2: 3GPP TS36. 211 V14.3.0, June 2017
Non-Patent Literature 3: 3GPP TS36. 212 V14.3.0, June 2017
Non-Patent Literature 4: 3GPP TS36. 213 V14.3.0, June 2017
Non-Patent Literature 5: 3GPP TS36. 214 V14.2.0, March 2017
Non-Patent Literature 6: 3GPP TS36. 321 V14.3.0, June 2017
Non-Patent Literature 7: 3GPP TS36. 322 V14.0.0, March 2017
Non-Patent Literature 8: 3GPP TS36. 323 V14.3.0, June 2017

Non-Patent Literature 9: 3GPP TS36. 331 V14.3.0, June 2017
Non-Patent Literature 10: 3GPP TS36. 413 V14.3.0, June 2017
Non-Patent Literature 11: 3GPP TS36. 423 V14.3.0, June 2017
Non-Patent Literature 12: 3GPP TS36. 425 V14.0.0, March 2017
Non-Patent Literature 13: 3GPP TR36. 912 V14.0.0, March 2017
Non-Patent Literature 14: 3GPP TR38. 912 V14.1.0, June 2017
Non-Patent Literature 15: 3GPP TR38. 913 V14.3.0, June 2017
Non-Patent Literature 16: 3GPP TR38. 801 V14.0.0, March 2017
Non-Patent Literature 17: 3GPP TR38. 802 V14.1.0, June 2017
Non-Patent Literature 18: 3GPP TR38. 803 V14.1.0, June 2017
Non-Patent Literature 19: 3GPP TR38. 804 V14.0.0, March 2017
Non-Patent Literature 20: 3GPP TR38. 900 V14.3.1, July 2017
Non-Patent Literature 21: 3GPP TS38. 300 V0.6.0, August 2017
Non-Patent Literature 22: 3GPP TS37. 340 V0.2.1, August 2017
Non-Patent Literature 23: 3GPP TS38. 201 V0.0.1, July 2017
Non-Patent Literature 24: 3GPP TS38. 202 V0.0.1, July 2017
Non-Patent Literature 25: 3GPP TS38. 211 V0.1.3, August 2017
Non-Patent Literature 26: 3GPP TS38. 212 V0.0.2, August 2017
Non-Patent Literature 27: 3GPP TS38. 213 V0.0.3, August 2017
Non-Patent Literature 28: 3GPP TS38. 214 V0.0.1, July 2017
Non-Patent Literature 29: 3GPP TS38. 215 V0.0.2, August 2017
Non-Patent Literature 30: 3GPP TS38. 321 V0.2.0, August 2017
Non-Patent Literature 31: 3GPP TS38. 322 V0.2.0, July 2017
Non-Patent Literature 32: 3GPP TS38. 323 V0.2.1, August 2017
Non-Patent Literature 33: 3GPP TS37. 324 V0.1.1, August 2017
Non-Patent Literature 34: 3GPP TS38. 331 V0.0.5, August 2017
Non-Patent Literature 35: 3GPP TS38. 401 V0.2.0, July 2017
Non-Patent Literature 36: 3GPP TS38. 410 V0.3.0, July 2017
Non-Patent Literature 37: 3GPP TS38. 413 V0.2.1, August 2017
Non-Patent Literature 38: 3GPP TS38. 420 V0.2.0, July 2017
Non-Patent Literature 39: 3GPP TS38. 423 V0.1.1, June 2017
Non-Patent Literature 40: 3GPP TS38. 470 V0.2.0, June 2017
Non-Patent Literature 41: 3GPP TS38. 473 V0.2.0, June 2017

Incidentally, in 3GPP, the DC has not been extensively discussed yet since the discussions have just begun. Therefore, when considering a new use case of the DC, some problems or defects unknown in the world may occur. For example, it is important whether it is possible to realize reliable data delivery. Particularly, in order to realize the reliable data delivery, it is important to prevent unnecessary data delivery. These have been rarely studied so far. Consequently, a method for realizing the reliable data delivery as the new use case of the DC does not exist in the related arts.

SUMMARY

According to an aspect of an embodiment of the invention, a wireless communication system includes a first wireless communication device, and a second wireless communication device. The first wireless communication device includes: a communicator that delivers, to the second wireless communication device, data addressed to a third wireless communication device and receives, from the second wireless communication device, information on communication quality according to failed data of which delivery fails among the data delivered from the second wireless communication device to the third wireless communication device; and a controller that controls delivery of the data in accordance with the information on the communication quality.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a block diagram illustrating an example of DC data delivery;

FIG. 7 is a diagram illustrating a format of a packet reported from a secondary base station to a master base station in LTE-A as an example of the DC data delivery;

FIG. 8 is a flowchart illustrating an example of the DC data delivery;

FIG. 11 is a diagram illustrating a format of a packet reported from a secondary base station to a master base station in LTE-A as an example of the DC data delivery in the wireless communication system according to the second embodiment;

FIG. 12 is a flowchart illustrating an example of the DC data delivery in the wireless communication system according to the second embodiment;

FIG. 14 is a diagram illustrating a report packet format in a modified example of FIG. 11;

FIG. 15 is a diagram illustrating a report packet format in the modified example of FIG. 11;

FIG. 16 is a diagram illustrating a report packet format in the modified example of FIG. 11;

FIG. 17 is a diagram illustrating a report packet format in the modified example of FIG. 11;

DESCRIPTION OF EMBODIMENTS

Hereinafter, embodiments of a wireless communication system, a base station, a user equipment, and a wireless communication method disclosed in the present application will be described in detail on the basis of the drawings. Note that the following embodiments do not limit the disclosed technology.

First Embodiment

[Wireless Communication System]

Figure 1:
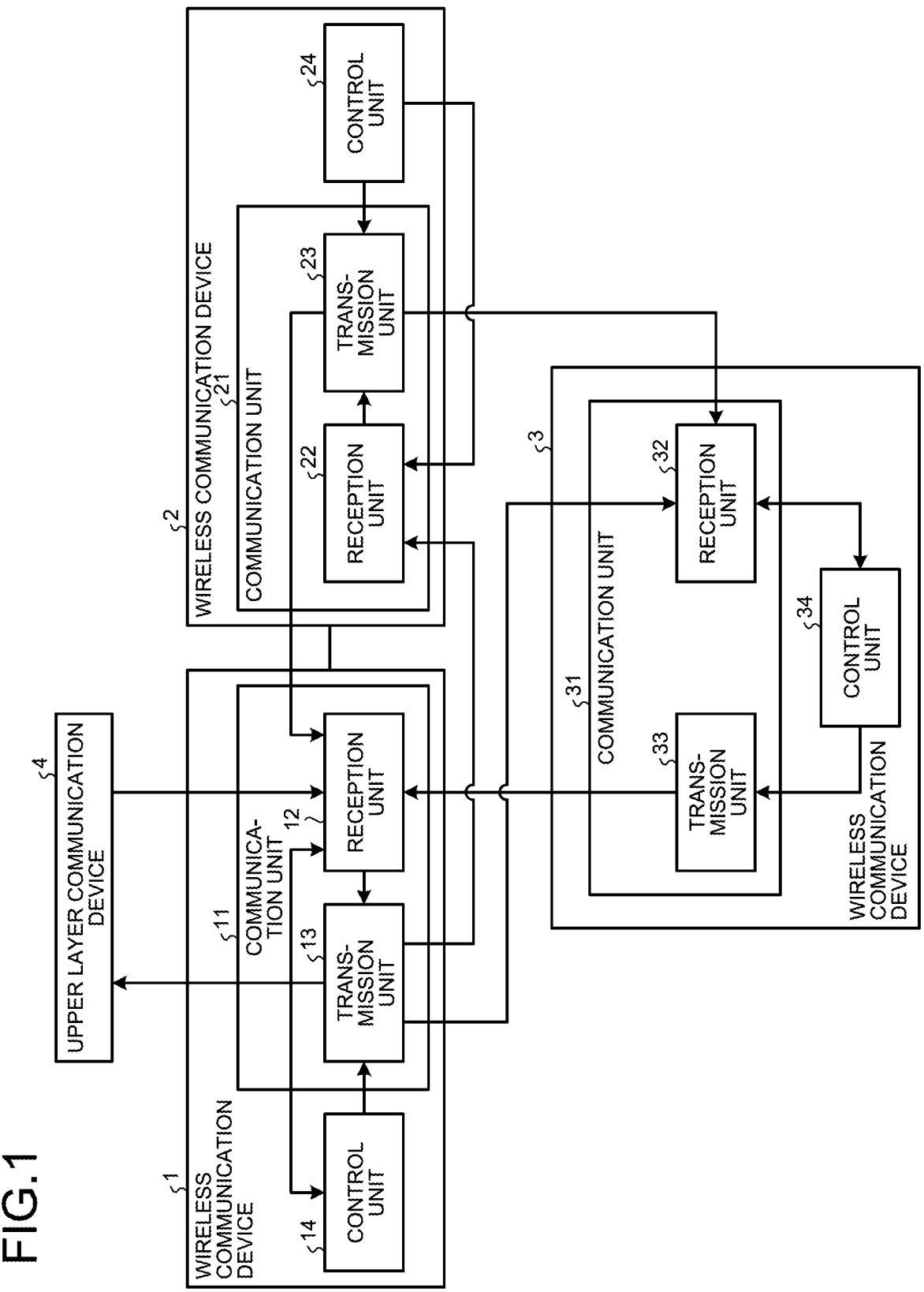
FIG. 1 is a block diagram illustrating an example of a configuration of a wireless communication system according to a first embodiment.

FIG. 1 is a block diagram illustrating an example of a wireless communication system according to a first embodiment. As illustrated in FIG. 1, the wireless communication system according to the first embodiment has a wireless communication device 1, a wireless communication device 2, a wireless communication device 3, and an upper layer communication device 4.

The wireless communication device 1 and the wireless communication device 2 have dual connectivity. The wireless communication device 1 is a primary wireless communication device in the dual connectivity, and the wireless communication device 2 is a secondary wireless communication device in the dual connectivity.

The wireless communication device 1 and the wireless communication device 2 are connected in a wired manner, for example. Then, the wireless communication device 1 and the wireless communication device 2 mutually transmit/receive data by using a wired link that connects them to each other. Furthermore, the wireless communication device 1/the wireless communication device 2 and the wireless communication device 3 are connected in a wireless manner.

The wireless communication device 1 has a communication unit 11 and a control unit 14.

The communication unit 11 communicates with the wireless communication device 2, the wireless communication device 3, and the upper layer communication device 4. That is, the communication unit 11 performs wired communication with the wireless communication device 2 and the upper layer communication device 4, and performs wireless communication with the wireless communication device 3.

Specifically, the communication unit 11 has a reception unit 12 and a transmission unit 13.

The reception unit 12 receives control data and user data from the upper layer communication device 4. Then, the reception unit 12 outputs the received control data and user data to the transmission unit 13. Note that the control data may be data generated by the wireless communication device 1 itself. Furthermore, the reception unit 12 receives, from the wireless communication device 2, information on the communication quality of user data that is transmitted from the wireless communication device 2 to the wireless communication device 3.

The transmission unit 13 wirelessly transmits the control data, which is output from the reception unit 12, to the wireless communication device 3. Furthermore, the transmission unit 13 transmits the user data, which is output from the reception unit 12, to the wireless communication device 2.

The control unit 14 performs overall control of the operations of the communication unit 11 including the reception unit 12 and the transmission unit 13. Furthermore, the control unit 14 controls the delivery of the user data in accordance with the information on the communication quality received by the reception unit 12.

The wireless communication device 2 has a communication unit 21 and a control unit 24.

The communication unit 21 communicates with the wireless communication device 1 and the wireless communication device 3. That is, the communication unit 21 performs wired communication with the wireless communication device 1, and performs wireless communication with the wireless communication device 3.

Specifically, the communication unit 21 has a reception unit 22 and a transmission unit 23.

The reception unit 22 receives the user data from the wireless communication device 1 via the wired connection. Then, the reception unit 22 outputs the received user data to the transmission unit 23.

The transmission unit 23 wirelessly transmits the user data, which is output from the reception unit 22, to the wireless communication device 3. Furthermore, the transmission unit 23 transmits the information on the communication quality of the user data, which is transmitted to the wireless communication device 3, to the wireless communication device 1.

The control unit 24 performs overall control of the operations of the communication unit 21 including the reception unit 22 and the transmission unit 23.

The wireless communication device 3 has a communication unit 31 and a control unit 34.

The communication unit 31 is simultaneously connected to the wireless communication device 1 and the wireless communication device 2, and simultaneously performs wireless communication with both base stations. That is, the communication unit 31 performs dual connectivity (hereinafter, referred to as "DC") with the wireless communication device 1 and the wireless communication device 2.

Specifically, the communication unit 31 has a reception unit 32 and a transmission unit 33. The reception unit 32 wirelessly receives the control data from the wireless communication device 1. Furthermore, the reception unit 32 wirelessly receives the user data from the wireless communication device 2. The transmission unit 33 transmits information on the reception of the user data to the wireless communication device 2.

The control unit 34 performs overall control of the operations of the communication unit 31 including the reception unit 32 and the transmission unit 33.

Figure 2:
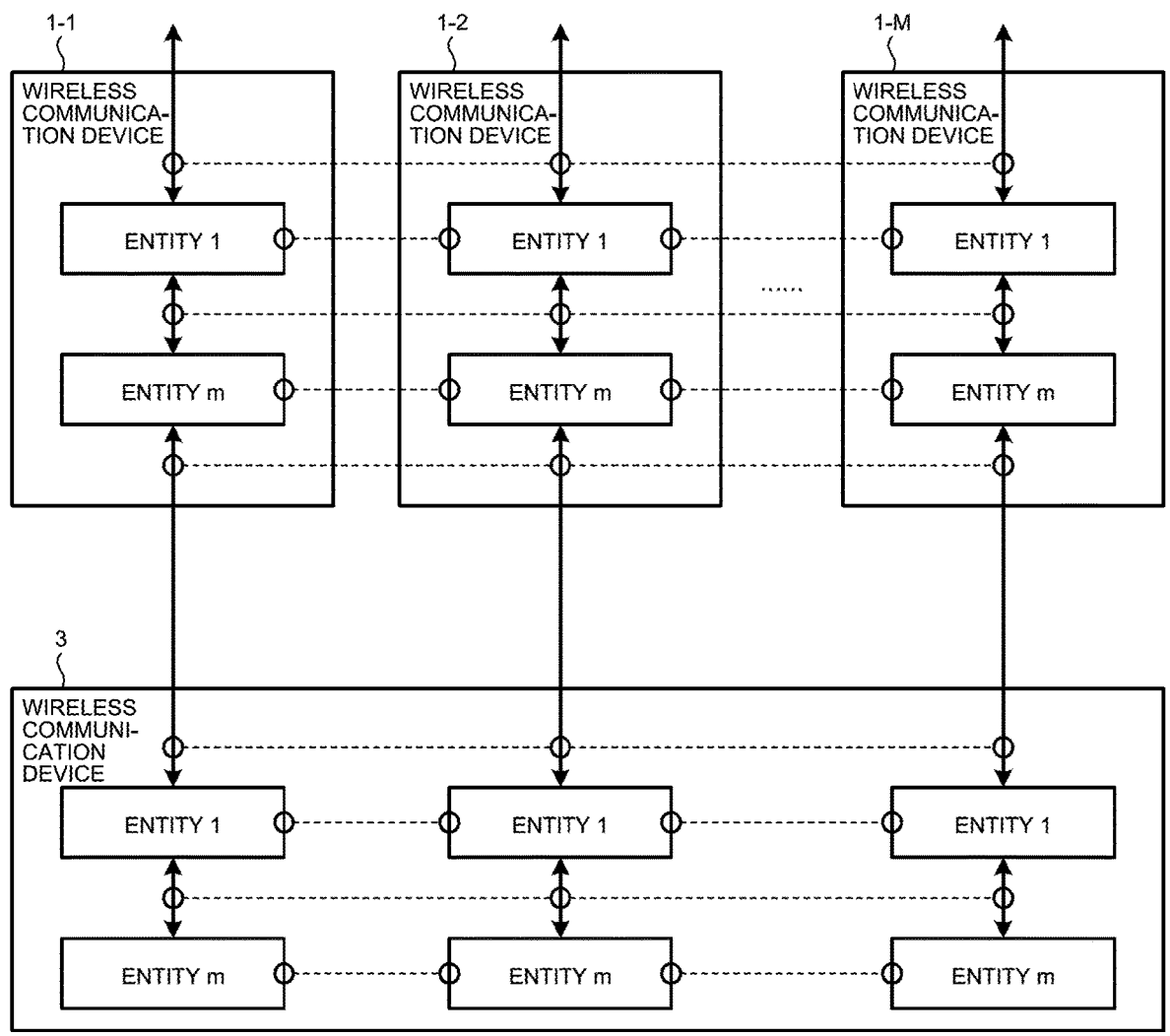
FIG. 2 is a conceptual diagram of a protocol stack of data communication in the wireless communication system according to the first embodiment.

FIG. 2 is a conceptual diagram of a protocol stack of data communication in the wireless communication system according to the first embodiment. For example, wireless communication devices 1-1 to 1-M illustrated in FIG. 2 correspond to the wireless communication device 1 and the wireless communication device 2 illustrated in FIG. 1.

The wireless communication devices 1-1 to 1-M illustrated in FIG. 2 have M connectivity. That is, in FIG. 1, the wireless communication device 3 has dual connectivity (DC) with the wireless communication device 1 and the wireless communication device 2; however, without being limited thereto, multi-connectivity, which is triple or more, can also be applied. Furthermore, as illustrated in FIG. 2, downlink communication and uplink communication can also be applied.

Furthermore, as illustrated in FIG. 2, a protocol stack in the wireless communication devices 1-1 to 1-M and the wireless communication device 2 includes entities that are logical (or virtual) processing subjects. The entity exists in each layer of the protocol stack, and the entity and a device, which is a physical processing subject, are not limited to one-to-one and may be m-to-one. That is, the entity can be applied to an m layer structure of two or more layers.

As described above, the communication unit 11 of the wireless communication device 1 delivers data, which is addressed to the wireless communication device 3, to the wireless communication device 2, and receives, from the wireless communication device 2, information on communication quality of data, which is delivered from the wireless communication device 2 to the wireless communication device 3. Then, the control unit 14 of the wireless communication device 1 controls the delivery of the data in accordance with the information on the communication quality. When considering a new use case of the DC, some problems or defects unknown in the world may occur. For example, it is important whether it is possible to realize reliable data delivery. Particularly, in order to realize the reliable data delivery, it is important to prevent unnecessary data delivery. Consequently, in the wireless communication system according to the first embodiment, the wireless communication device 1 considers information on the communication quality of data, so that it is possible to realize the reliable data delivery.

Second Embodiment

[Wireless Communication System]

Figure 3:
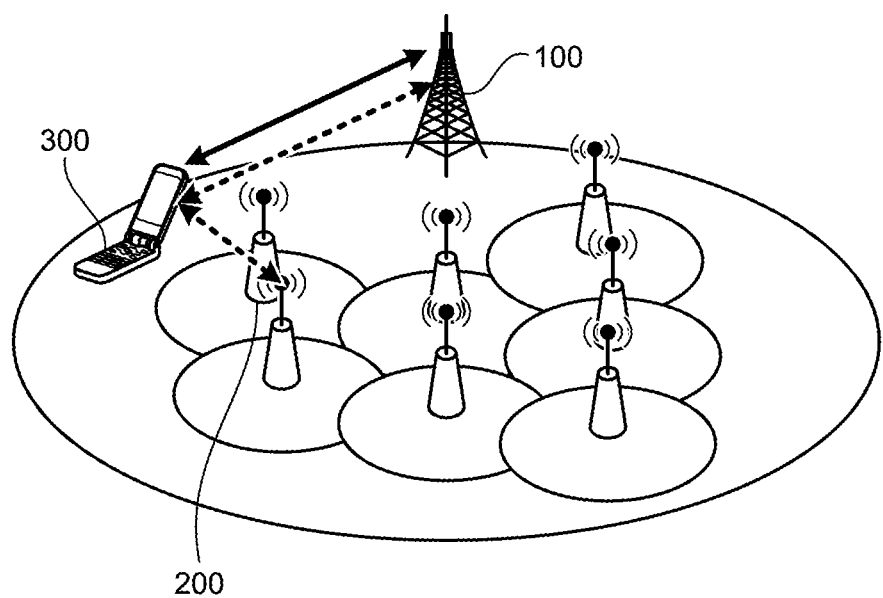
FIG. 3 is a diagram illustrating a configuration example of a wireless communication system according to a second embodiment.

Next, a second embodiment will be described. FIG. 3 is a diagram illustrating a configuration example of a wireless communication system according to the second embodiment. As illustrated in FIG. 3, the wireless communication system according to the second embodiment has a master base station 100 as the wireless communication device 1 in FIG. 1. Furthermore, the wireless communication system according to the second embodiment has a secondary base station 200 as the wireless communication device 2 in FIG. 1. Furthermore, the wireless communication system according to the second embodiment has a user equipment 300 as the wireless communication device 3 in FIG. 1.

The user equipment 300 is connected to the master base station 100 by a control plane (see a solid line arrow illustrated in FIG. 3) and a user plane (see a dotted line arrow illustrated in FIG. 3). Consequently, the master base station 100 is also referred to as a primary base station, a macro base station, or the like. Furthermore, the user equipment 300 is connected to the secondary base station 200 by the user plane. Consequently, the secondary base station 200 is also referred to as a small base station or the like.

Figure 4:
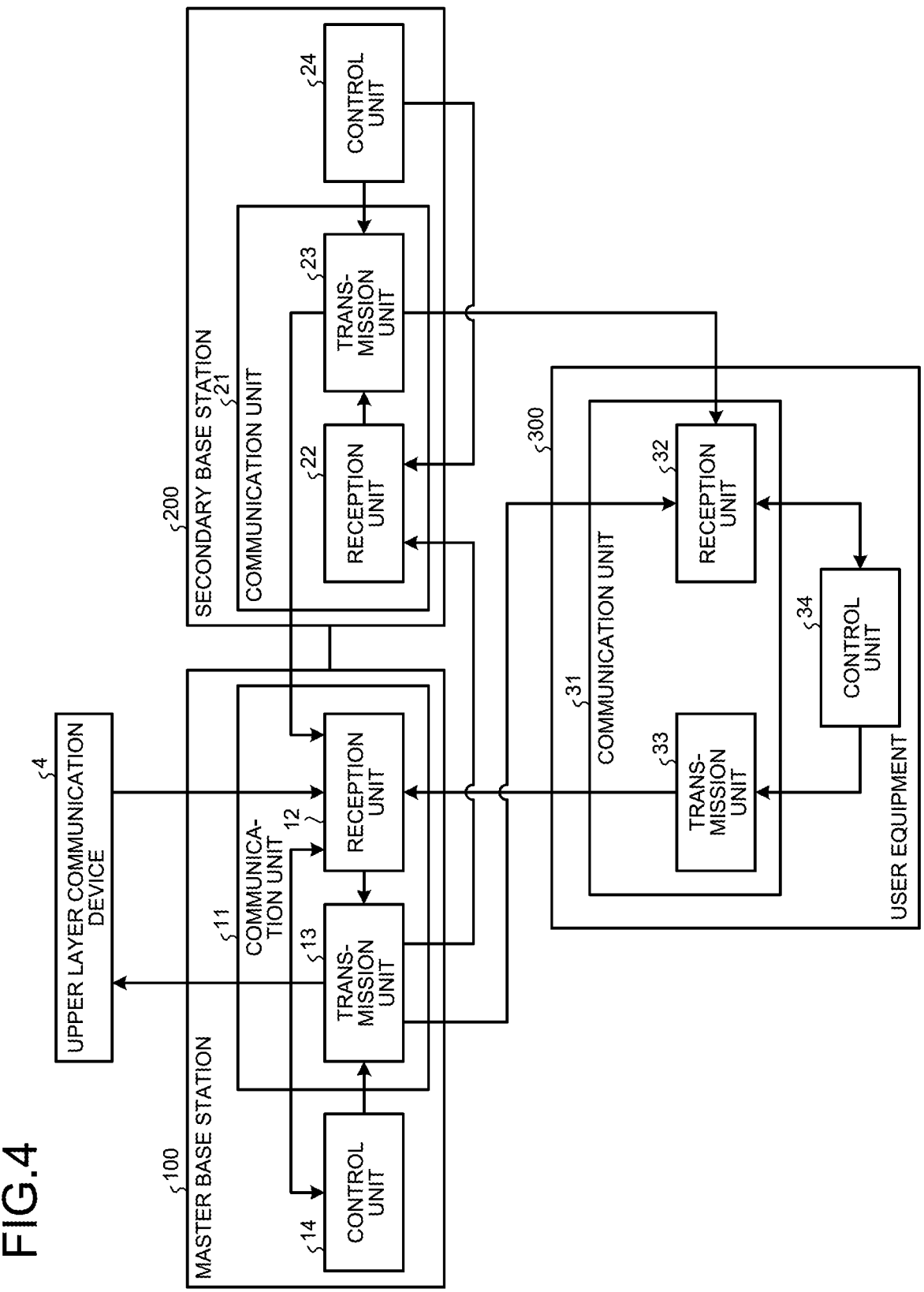
FIG. 4 is a block diagram illustrating an example of a configuration of the wireless communication system according to the second embodiment.

FIG. 4 is a block diagram illustrating an example of the configuration of the wireless communication system according to the second embodiment. As illustrated in FIG. 4, the master base station 100 is connected to the upper layer communication device 4, and the master base station 100 and the secondary base station 200 are connected in a wired manner by using, for example, an X2 interface. Then, the master base station 100 and the secondary base station 200 perform wireless communication with the user equipment 300. It is assumed that in FIG. 4, the wireless communication system according to the second embodiment has the same function for each unit having the same reference numeral as FIG. 1 unless otherwise specified.

Furthermore, the master base station 100, the secondary base station 200, and the user equipment 300 perform communication by using a link layer protocol corresponding to a plurality of link layers. For example, a link layer protocol corresponding to a packet data convergence protocol (PDCP) layer, a radio link control (RLC) layer, a medium access control (MAC) layer, a physical (PHY) layer and the like is used.

Figure 5:
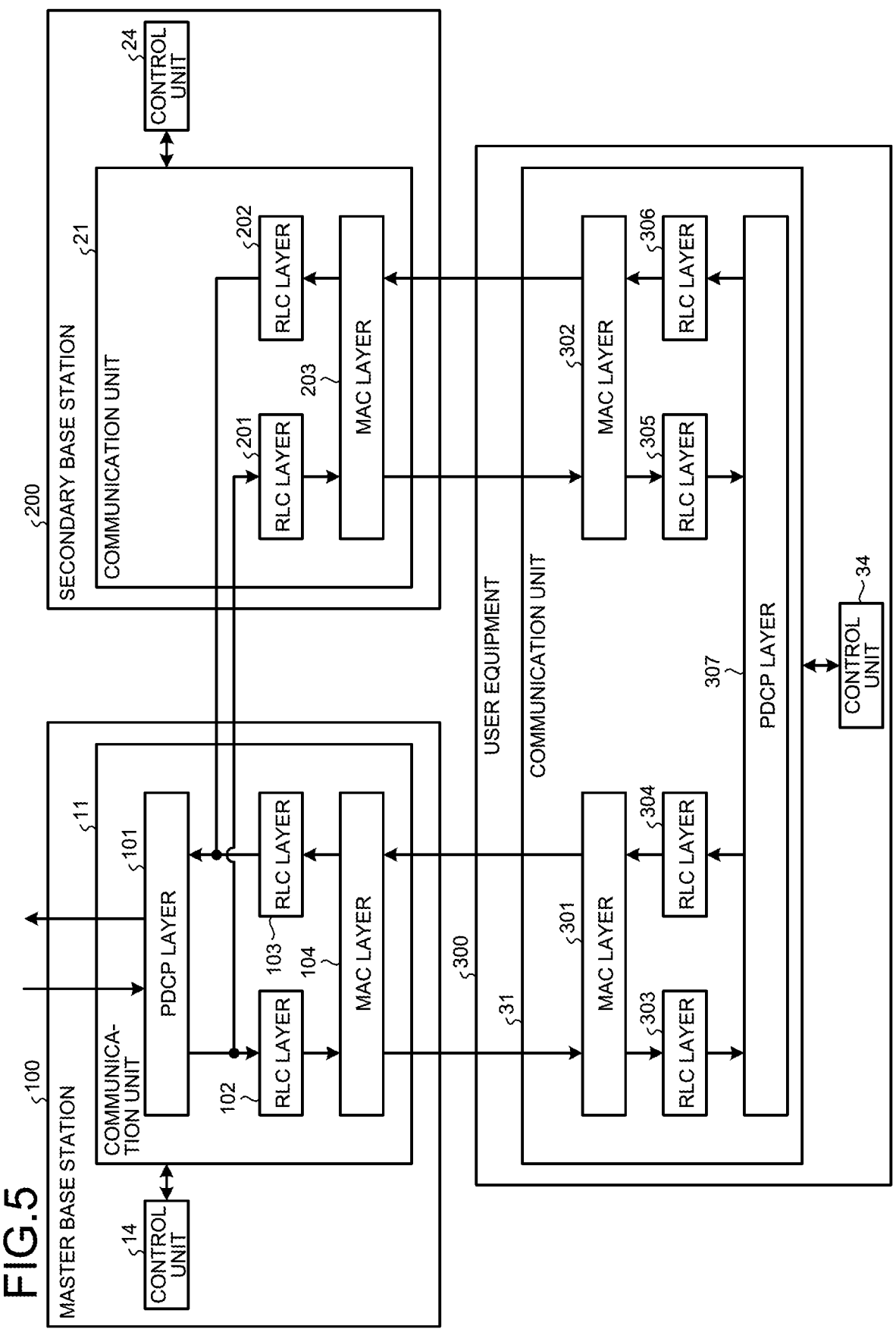
FIG. 5 is a block diagram illustrating an example of a layer configuration of the wireless communication system according to the second embodiment.

Thus, with reference to FIG. 5, processing performed for each link layer will be described. FIG. 5 is a block diagram illustrating an example of the layer configuration of the wireless communication system according to the second embodiment.

The communication unit 11 of the master base station 100 has a PDCP layer 101, RLC layers 102 and 103, and a MAC layer 104. The RLC layer 102 is a downlink RLC layer and the RLC layer 103 is an uplink RLC layer. Note that the master base station 100 may have a layer (not illustrated) such as a PHY layer.

The communication unit 11 receives control data transmitted from the upper layer communication device 4 in the PDCP layer 101, and transmits the control data to the user equipment 300 via the RLC layer 102 and the MAC layer 104. The communication unit 11 receives user data transmitted from the upper layer communication device 4 in the PDCP layer 101, and transmits the user data to the secondary base station 200.

The communication unit 21 of the secondary base station 200 has RLC layers 201 and 202 and a MAC layer 203. The RLC layer 201 is a downlink RLC layer and the RLC layer 202 is an uplink RLC layer. Note that the secondary base station 200 may have a layer (not illustrated) such as a PHY layer.

The communication unit 21 receives the user data transmitted from the master base station 100 in the RLC layer 201, and transmits the user data to the user equipment 300 via the MAC layer 203.

The communication unit 31 of the user equipment 300 has MAC layers 301 and 302, RLC layers 303 to 306, and a PDCP layer 307. The RLC layers 303 and 305 are downlink RLC layers and the RLC layers 304 and 306 are uplink RLC layers. Note that the user equipment 300 may have a layer (not illustrated) such as a PHY layer.

The communication unit 31 wirelessly receives the control data transmitted from the master base station 100 in the MAC layer 301, and outputs the control data to the PDCP layer 307 via the RLC layer 303. Furthermore, the communication unit 31 wirelessly receives the user data transmitted from the secondary base station 200 in the MAC layer 302, and outputs the user data to the PDCP layer 307 via the RLC layer 305.

[Data Delivery]

Hereinafter, data delivery of dual connectivity (DC) will be described.

In 3GPP, in the DC, the master base station 100 delivers data to the secondary base station 200, and the secondary base station 200 transmits the data received from the master base station 100 to the user equipment 300. Here, it is important to avoid buffer leakage of the secondary base station 200 in order to maintain throughput.

FIG. 6 is a block diagram illustrating an example of the DC data delivery. The communication unit 11 of the master base station 100 receives user data (data) transmitted from the upper layer communication device 4 in the PDCP layer 101. Then, the communication unit 11 assigns sequence numbers to packets of the received data in the PDCP layer 101. The sequence number is an identifier indicating the order of data delivery. For example, the communication unit 11 assigns sequence numbers "1" to "n" to received first to $n^{th}$ data in the PDCP layer 101, respectively. The communication unit 11 transmits the data with the assigned sequence numbers to the secondary base station 200 in the PDCP layer 101.

For example, as illustrated in FIG. 6, the communication unit 21 of the secondary base station 200 receives the first data, to which the sequence number "1" is assigned, from the master base station 100 in the RLC layer 201, and transmits the received data to the user equipment 300 via the MAC layer 203. Furthermore, the communication unit 21 of the secondary base station 200 receives the second to $n^{th}$ data, to which the sequence numbers "2" to "n" are respectively assigned, from the master base station 100 in the RLC layer 201, and stores the received data in a buffer (not illustrated). That is, the second to $n^{th}$ data are retained in the secondary base station 200.

Furthermore, as illustrated in FIG. 6, the communication unit 11 of the master base station 100 is about to transmit $(n+1)^{th}$ data, to which a sequence number "n+1" is assigned, to the secondary base station 200 in the PDCP layer 101.

FIG. 7 is a diagram illustrating a format of a packet reported from the secondary base station 200 to the master base station 100 in LTE-A as an example of the DC data delivery. This format is described in section 5.5.2.2 of 3GPP TS36.425 (Non-Patent Literature 12).

For example, the packet reported from the secondary base station 200 to the master base station 100 includes information indicating a buffer size of the secondary base station 200 (see "Desired buffer size for the E-RAB" of FIG. 7). Since a bandwidth delay product is important for improving throughput, a desired amount of data buffering is reported from the secondary base station 200 to the master base station 100.

For example, the packet reported from the secondary base station 200 to the master base station 100 includes information indicating a minimum buffer size of the user equipment 300 (see "Minimum desired buffer size for the UE" of FIG. 7). Although the bandwidth delay product is important for improving throughput, reduction of buffering delay is also important; thus, a data retention amount of the entire user equipment 300 is reported from the secondary base station 200 to the master base station 100.

For example, the packet reported from the secondary base station 200 to the master base station 100 includes information indicating a maximum sequence number for which data delivery has been successful (see "Highest successfully delivered PDCP Sequence Number" in FIG. 7). Hereinafter, the maximum sequence number for which data delivery has been successful is referred to as "H-PDCP SN".

As illustrated in FIG. 6, the communication unit 21 of the secondary base station 200 receives the first data, to which the sequence number "1" is assigned, from the master base station 100 in the RLC layer 201, and transmits the received data to the user equipment 300 via the MAC layer 203. In such a case, as illustrated in FIG. 6, the communication unit 21 of the secondary base station 200 reports the sequence number "1" to the RLC layer 202 in the MAC layer 203. Next, the RLC layer 202 reports the sequence number "1" to an X2 user plane (X2 UP) protocol. The X2 UP protocol is a protocol for controlling a user plane in an X2 interface. Finally, the X2 UP protocol constructs a control message and reports the sequence number "1" to the master base station 100. That is, the sequence number "1" is reported from the secondary base station 200 to the master base station 100 as the H-PDCP SN.

Since the H-PDCP SN represents "1", when the communication unit 11 in the master base station 100 is about to transmit the $(n+1)^{th}$ data to the secondary base station 200, the control unit 14 can estimate that a queue length Q is n−1. That is, the control unit 14 of the master base station 100 can estimate that the second to $n^{th}$ data are retained in the secondary base station 200. In general, data delivery is performed in consideration of not only the queue length Q, but also wireless link quality and the like.

FIG. 8 is a flowchart illustrating an example of the DC data delivery. The communication unit 11 of the master base station 100 receives the packet reported from the secondary base station 200 in the PDCP layer 101 (step S100), and the control unit 14 estimates the queue length Q based on the H-PDCP SN included in the packet. Then, the control unit 14 of the master base station 100 determines whether the estimated queue length Q is larger than a set queue length Qth (step S101).

When the queue length Q is larger than the set queue length Qth (Yes at step S101), the control unit 14 of the master base station 100 controls the communication unit 11 so as to avoid data delivery to the secondary base station 200 (step S102). That is, the communication unit 11 of the master base station 100 does not transmit the $(n+1)^{th}$ data to the secondary base station 200. Thereafter, step S100 is performed.

On the other hand, when the queue length Q is equal to or less than the set queue length Qth (No at step S101), the control unit 14 of the master base station 100 controls the communication unit 11 to perform the data delivery to the secondary base station 200 (step S103). That is, the communication unit 11 of the master base station 100 transmits the $(n+1)^{th}$ data, to which the sequence number "n+1" is assigned, to the secondary base station 200 in the PDCP layer 101. Thereafter, step S100 is performed.

Here, the master base station 100 avoids the data delivery when the queue length Q is larger than the set queue length Qth (Yes at step S101) and performs the data delivery when the queue length Q is equal to or less than the set queue length Qth (No at step S101), but these are not limitative. For example, the master base station 100 may avoid the data delivery when the queue length Q is equal to or more than the set queue length Qth and perform the data delivery when the queue length Q is smaller than the set queue length Qth.

Problem

Hereinafter, problems when considering a new use case of the DC will be described. Note that these problems were newly found by the inventors as a result of examining the new use case of the DC and were not known in the related arts.

As the new use case of the DC, for example, DC for ultra-reliable and low delay communications (hereinafter, referred to as "URLLC") is considered. In the DC for URLLC, it is important whether it is possible to realize reliable data delivery. Particularly, in order to realize reliable data delivery, it is important to prevent unnecessary data delivery.

However, in the aforementioned DC data delivery, the master base station 100 estimates the queue length Q based on the H-PDCP SN reported from the secondary base station 200. However, it is difficult to realize reliable data delivery by using the estimated queue length Q.

Figure 9:
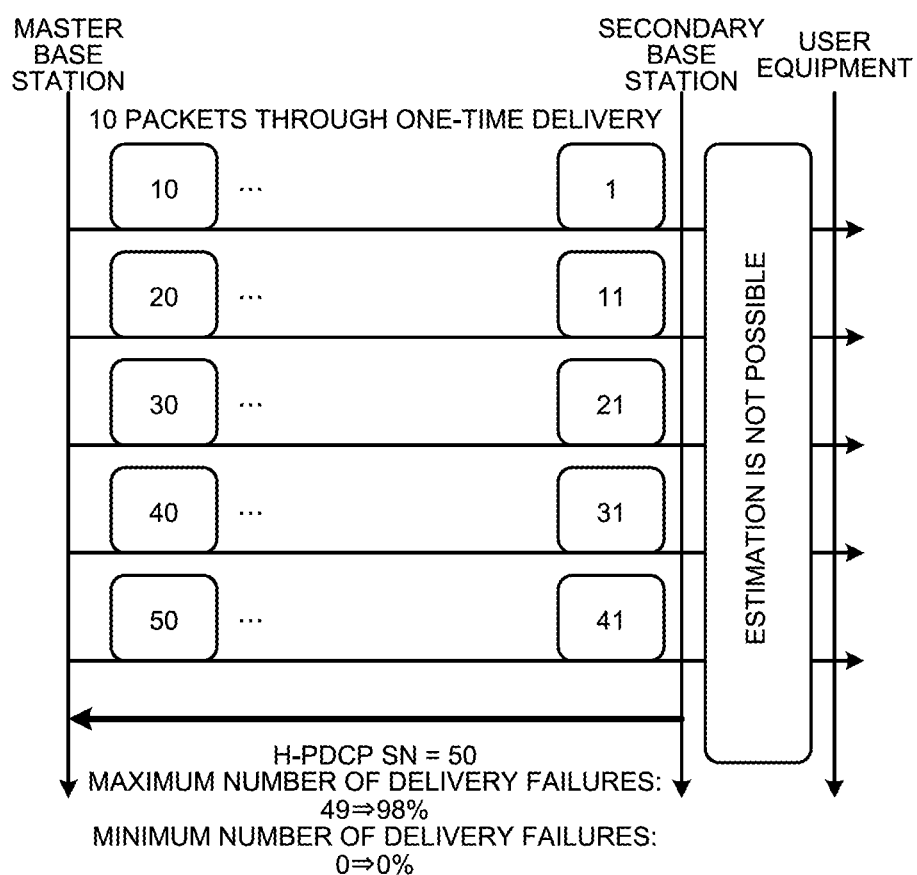
FIG. 9 is an explanatory diagram of a case where data is delivered at a rate of 10 Mb/s at intervals of 10 ms (packet length 1,500B) as the DC data delivery.

FIG. 9 is an explanatory diagram of a case where data is delivered at a rate of 10 Mb/s at intervals of 10 ms (packet length 1,500B) as DC data delivery. The communication unit 11 of the master base station 100 delivers first to 50th data, to which sequence numbers "1" to "50" are respectively assigned. It is assumed that the H-PDCP SN reported from the secondary base station 200 to the master base station 100 is "50". In such a case, in the DC data delivery, a maximum sequence number "50" for which data delivery has been successful is reported to the master base station 100 as the H-PDCP SN. However, the master base station 100 does not consider information on communication quality of data, that is, communication quality of data delivered from the secondary base station 200 to the user equipment 300.

For example, in FIG. 9, in a case where the number of sequence numbers for which data delivery has failed (the minimum number of delivery failures) is 0 when the master base station 100 receives the H-PDCP SN "50", an error rate is 0%. However, the H-PDCP SN "50" is a maximum sequence number for which data delivery has been successful. Therefore, in a case where the number of sequence numbers for which data delivery has failed (the maximum number of delivery failures) is 49 when the master base station 100 receives the H-PDCP SN "50", the error rate is 98%.

As described above, in the aforementioned DC data delivery, since the master base station 100 does not consider information on communication quality even though the report of the maximum sequence number for which data delivery has been successful is received as the H-PDCP SN, it is difficult to realize reliable data delivery. It is desired that data is delivered from the master base station 100 when communication quality is high, and data delivery by the master base station 100 is avoided when communication quality is degraded.

Solution

Therefore, in the wireless communication system according to the second embodiment, the number of sequence numbers for which data delivery has failed is reported from the secondary base station 200 to the master base station 100 as information on communication quality of data delivered from the secondary base station 200 to the user equipment 300. The master base station 100 controls data delivery in accordance with information on the communication quality of data. That is, data delivery or avoidance is performed.

In this way, in the wireless communication system according to the second embodiment, it is possible to realize DC for URLLC as a new use case of DC. That is, in the wireless communication system according to the second embodiment, it is possible to prevent unnecessary data delivery.

Figure 10:
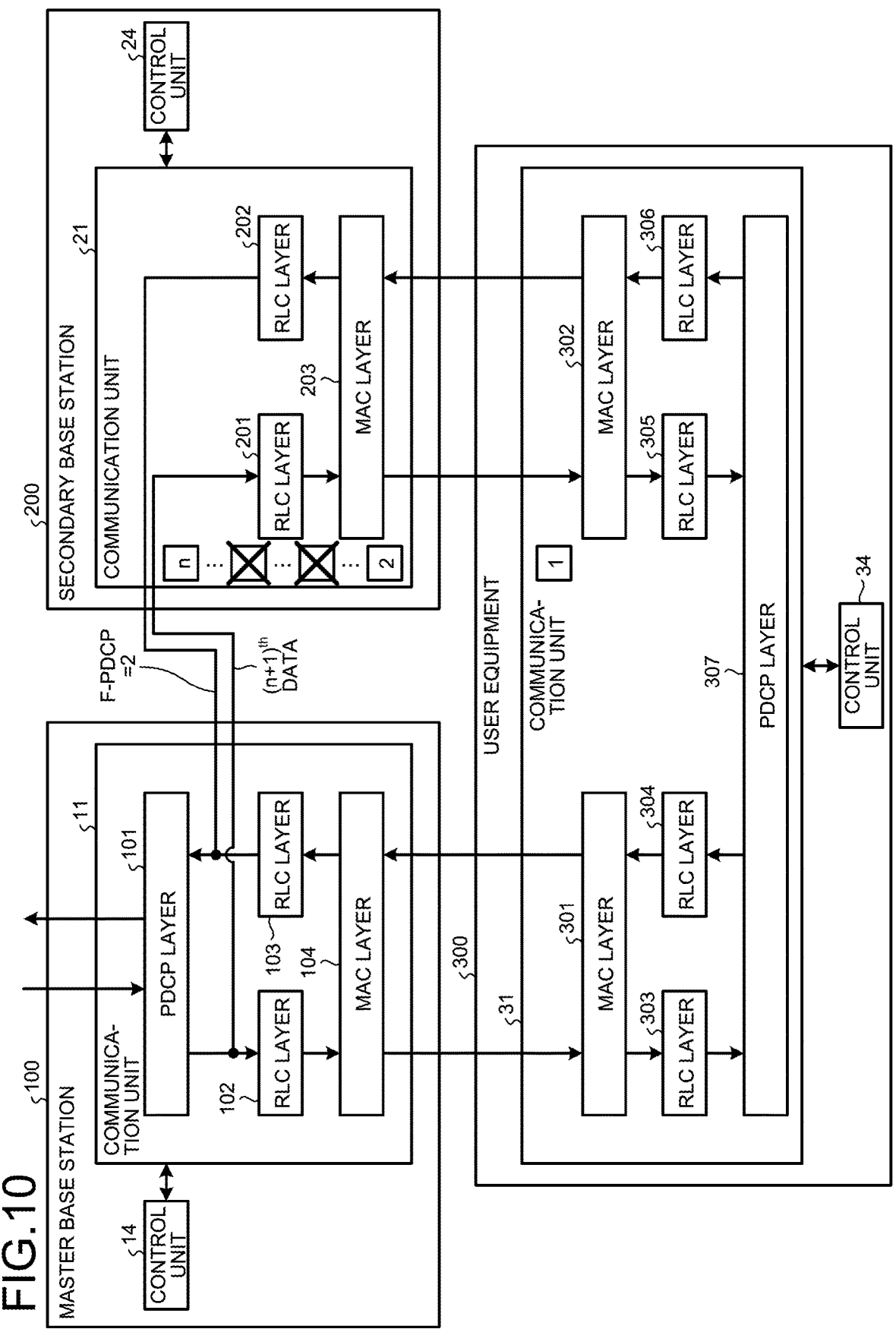
FIG. 10 is a block diagram illustrating an example of the DC data delivery in the wireless communication system according to the second embodiment.

FIG. 10 is a block diagram illustrating an example of the DC data delivery in the wireless communication system according to the second embodiment. The communication unit 11 of the master base station 100 receives user data (data) transmitted from the upper layer communication device 4 in the PDCP layer 101. Then, the communication unit 11 assigns sequence numbers to packets of the received data in the PDCP layer 101. The sequence number is an identifier indicating the order of data delivery. For example, the communication unit 11 assigns sequence numbers "1" to "n" respectively to received first to $n^{th}$ data in the PDCP layer 101. The communication unit 11 transmits the data with the assigned sequence numbers to the secondary base station 200 in the PDCP layer 101.

For example, as illustrated in FIG. 10, the communication unit 21 of the secondary base station 200 receives the first data, to which the sequence number "1" is assigned, from the master base station 100 in the RLC layer 201, and transmits the received data to the user equipment 300 via the MAC layer 203. Furthermore, the communication unit 21 of the secondary base station 200 receives the second to $n^{th}$ data, to which the sequence numbers "2" to "n" are respectively assigned, from the master base station 100 in the RLC layer 201, and stores the received data in the buffer (not illustrated). That is, the second to $n^{th}$ data are retained in the secondary base station 200.

Furthermore, as illustrated in FIG. 10, the communication unit 11 of the master base station 100 is about to transmit $(n+1)^{th}$ data, to which a sequence number "n+1" is assigned, to the secondary base station 200 in the PDCP layer 101.

FIG. 11 is a diagram illustrating a format of a packet reported from the secondary base station 200 to the master base station 100 in LTE-A as an example of the DC data delivery in the wireless communication system according to the second embodiment.

For example, the packet reported from the secondary base station 200 to the master base station 100 includes information indicating the number of sequence numbers for which data delivery has failed (see "Rate of failed delivered PDCP Sequence Number" of FIG. 11). Hereinafter, the number of sequence numbers for which data delivery has failed is referred to as "F-PDCP SN". In such a case, the packet reported from the secondary base station 200 to the master base station 100 includes information indicating the F-PDCP SN, instead of the information indicating the H-PDCP SN (see "Highest successfully delivered PDCP Sequence Number" of FIG. 7).

As illustrated in FIG. 10, the communication unit 21 of the secondary base station 200 receives the first data, to which the sequence number "1" is assigned, from the master base station 100 in the RLC layer 201, and transmits the received data to the user equipment 300 via the MAC layer 203. Furthermore, the communication unit 21 of the secondary base station 200 receives the second to $n^{th}$ data, to which the sequence number "2" to "n" are respectively assigned, from the master base station 100 in the RLC layer 201, and sequentially transmits the received data to the user equipment 300 via the MAC layer 203. At this time, for example, it is assumed that the communication unit 21 of the secondary base station 200 has failed to deliver the tenth data, to which the sequence number "10" is assigned, and the $22^{nd}$ data, to which the sequence number "22" is assigned, as data delivery to the user equipment 300. In such a case, as illustrated in FIG. 10, the communication unit 21 of the secondary base station 200 reports two sequence numbers "10" and "22" to the RLC layer 202 in the MAC layer 203. Next, the RLC layer 202 reports the sequence numbers "10"

and "22" to the X2 user plane (X2 UP) protocol. Finally, the X2 UP protocol constructs a control message and reports the sequence numbers "10" and "22" to the master base station 100. That is, the number "2" of sequence numbers for which data delivery has failed is reported from the secondary base station 200 to the master base station 100 as the F-PDCP SN.

Since the F-PDCP SN represents "2", when the communication unit 11 in the master base station 100 is about to transmit the $(n+1)^{th}$ data to the secondary base station 200, the control unit 14 recognizes that the number of failures N is 2 as the number of data delivery failures. In such a case, the control unit 14 of the master base station 100 controls data delivery in accordance with the recognized number of failures N as information on communication quality (F-PDCP SN).

A specific example of a case where the secondary base station 200 has failed in data delivery will be described.

For example, in FIG. 10, the control unit 24 of the secondary base station 200 monitors the communication unit 21 and detects an error when data has been transmitted to the user equipment 300. The error to be detected is, for example, an error in which reception acknowledge (ACK) of data is not received from the user equipment 300 even though a predetermined time has elapsed after the data is transmitted to the user equipment 300, an error in which the number of data retransmissions reaches a predetermined maximum number of retransmissions, and the like. When the error is detected, the control unit 24 of the secondary base station 200 recognizes that data delivery has failed. In such a case, data delivery by the master base station 100 is controlled in accordance with the number of failures N as the information on communication quality (F-PDCP SN).

For example, in FIG. 10, the control unit 34 of the user equipment 300 monitors the communication unit 31 and detects an error when receiving data delivered (transmitted) from the secondary base station 200. In such a case, the control unit 34 of the user equipment 300 controls the communication unit 31 to report information on data reception (reception error information) to the secondary base station 200. The detected error is, for example, an error in which desired data is not received even though a predetermined time has elapsed after data is received from the secondary base station 200, an error in which the number of data retransmissions reaches a predetermined maximum number of retransmissions, and the like. The control unit 24 of the secondary base station 200 monitors the communication unit 21, and recognizes that data delivery has failed when the reception error information is received from the user equipment 300. In such a case, the information on the communication quality of data (F-PDCP SN) delivered from the secondary base station 200 to the user equipment 300 is reported from the secondary base station 200 to the master base station 100 in accordance with the information on data reception (reception error information). Moreover, data delivery from the master base station 100 to the secondary base station 200 is controlled in accordance with the number of failures N as the information on the communication quality (F-PDCP SN).

FIG. 12 is a flowchart illustrating an example of the DC data delivery in the wireless communication system according to the second embodiment. The communication unit 11 of the master base station 100 receives the packet reported from the secondary base station 200 in the PDCP layer 101 (step S200), and the control unit 14 recognizes the number of failures N by the F-PDCP SN included in the packet. Then, the control unit 14 of the master base station 100 determines whether the recognized number of failures N is larger than the number of failures Nth configured for the number of failures (step S201).

When the number of failures N is larger than the configured number of failures Nth (Yes at step S201), the control unit 14 of the master base station 100 controls the communication unit 11 so as to avoid data delivery to the secondary base station 200 (step S202). That is, the communication unit 11 of the master base station 100 does not transmit the $(n+1)^{th}$ data to the secondary base station 200. Thereafter, step S200 is performed.

On the other hand, when the number of failures N is equal to or less than the configured number of failures Nth (No at step S201), the control unit 14 of the master base station 100 controls the communication unit 11 to perform the data delivery to the secondary base station 200 (step S203). That is, the communication unit 11 of the master base station 100 transmits the $(n+1)^{th}$ data, to which the sequence number "n+1" is assigned, to the secondary base station 200 in the PDCP layer 101. Thereafter, step S200 is performed.

Here, the master base station 100 avoids the data delivery when the number of failures N is larger than the configured number of failures Nth (Yes at step S201) and performs the data delivery when the number of failures N is equal to or less than the configured number of failures Nth (No at step S201), but these are not limitative. For example, the master base station 100 may avoid the data delivery when the number of failures N is equal to or more than the configured number of failures Nth and perform the data delivery when the number of failures N is smaller than the configured number of failures Nth.

Figure 13:
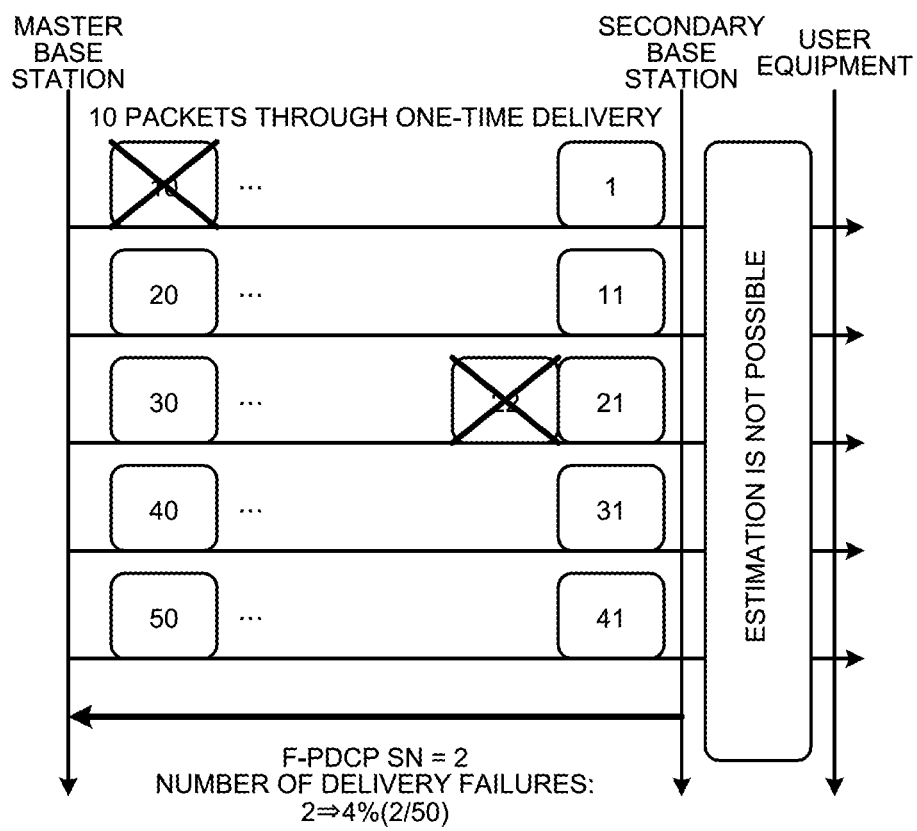
FIG. 13 is an explanatory diagram of a case where data is delivered at a rate of 10 Mb/s at intervals of 10 ms (packet length 1,500B) as the DC data delivery in the wireless communication system according to the second embodiment.

FIG. 13 is an explanatory diagram of a case where data is delivered at a rate of 10 Mb/s at intervals of 10 ms (packet length 1,500B) as the DC data delivery in the wireless communication system according to the second embodiment. The communication unit 11 of the master base station 100 delivers first to 50th data, to which sequence numbers "1" to "50" are respectively assigned. It is assumed that the F-PDCP SN reported from the secondary base station 200 to the master base station 100 is "2" as information on the communication quality of data delivered from the secondary base station 200 to the user equipment 300. That is, in the DC data delivery in the wireless communication system according to the second embodiment, the number "2" of sequence numbers for which data delivery has failed is reported from the secondary base station 200 to the master base station 100 as the F-PDCP SN. Therefore, in the wireless communication system according to the second embodiment, the master base station 100 can consider information on data communication quality by receiving the F-PDCP SN "2" reported from the secondary base station 200.

For example, in FIG. 13, the secondary base station 200 has failed to deliver the tenth data, to which the sequence number "10" is assigned, and the $22^{nd}$ data, to which the sequence number "22" is assigned, as data delivery to the user equipment 300. In FIG. 13, when the F-PDCP SN "2" reported from the secondary base station 200 is received, the master base station 100 recognizes the number of sequence numbers for which data delivery has failed (the number of failures N). In such a case, since the number of failures N is 2, the error rate is 4%.

Therefore, when the number of failures N is equal to or less than the configured number of failures Nth, that is, when data communication quality is high, the control unit 14 of the master base station 100 controls the communication unit 11 to deliver data, which is addressed to the user equipment 300, to the secondary base station 200. On the other hand, when the number of failures N is larger than the configured number of failures Nth, that is, when the data communication quality is degraded, the control unit 14 of the master base station 100 controls the communication unit 11 so as to avoid the delivery of the data addressed to the user equipment 300.

As described above, in the DC data delivery in the wireless communication system according to the second embodiment, the master base station 100 can consider information on data communication quality by receiving a report of the number of sequence numbers, for which data delivery has failed, as the F-PDCP SN. The communication unit 11 of the master base station 100 transmits data, which is addressed to the user equipment 300, to the secondary base station 200, and receives, from the secondary base station 200, information on the communication quality of data (F-PDCP SN), which is delivered from the secondary base station 200 to the user equipment 300. Then, the control unit 14 of the master base station 100 controls data delivery in accordance with the information on the communication quality (F-PDCP SN). Consequently, in the wireless communication system according to the second embodiment, the master base station 100 considers the information on the communication quality of data (F-PDCP SN), so that it is possible to realize reliable data delivery.

In the second embodiment, for ease of description, the master base station 100 delivers the first to 50th data to the secondary base station 200, and controls data delivery in accordance with the F-PDCP SN "2" reported from the secondary base station 200. That is, for ease of description, the control unit 14 of the master base station 100 controls data delivery based on the error rate of 4%. However, these are not limitative. For example, in order to improve reliability, the control unit 14 of the master base station 100 may control data delivery based on the error rate of $10^{-5}$.

Such a case will be described using FIG. 12. First, the number of sequence numbers for which data delivery has failed is reported from the secondary base station 200 to the master base station 100 (step S200). Since the communication unit 11 of the master base station 100 delivers a plurality of data to the secondary base station 200, the number of data deliveries is a denominator in calculating the error rate. Therefore, the control unit 14 of the master base station 100 calculates an error rate in accordance with the number of sequence numbers for which data delivery has failed, which is reported from the secondary base station 200. Then, the control unit 14 of the master base station 100 determines whether the error rate is larger than a configured error rate $10^{-5}$. The error rate and the configured error rate $10^{-5}$ correspond to the number of failures N and the configured number of failures Nth of FIG. 12, respectively (step S201). When the error rate is equal to or less than the configured error rate $10^{-5}$ (No at step S201), the control unit 14 of the master base station 100 controls the communication unit 11 to deliver data, which is addressed to the user equipment 300, to the secondary base station 200 (step S203). On the other hand, when the error rate is larger than the configured error rate $10^{-5}$ (Yes at step S201), the control unit 14 of the master base station 100 controls the communication unit 11 so as to avoid the delivery of the data addressed to the user equipment 300 (step S202).

In order to determine whether the error rate is larger than the configured error rate $10^{-5}$, the denominator needs at least 100,000 data. Therefore, when the number of data does not reach the aforementioned number, the denominator is set to 100,000, and when the number of data is greater than the aforementioned number, the denominator can be set to the actually measured number.

As described above, in the wireless communication system according to the second embodiment, the master base station 100 considers the error rate from the information on the communication quality of data (F-PDCP SN), so that it is possible to realize reliable data delivery.

Furthermore, in the second embodiment, the communication unit 11 of the master base station 100 assigns an identifier (sequence number) indicating the order of data delivery to data addressed to the user equipment 300. In this way, information on communication quality is not limited to the number (F-PDCP SN) of sequence numbers for which data delivery has failed, and may represent the number of sequence numbers for which data delivery has been successful.

In such a case, in FIG. 10, the control unit 24 of the secondary base station 200 controls the communication unit 21 to report the number of sequence numbers for which data delivery has been successful to the master base station 100 as the information on the communication quality.

Such a case will be described using FIG. 12. First, the number of sequence numbers for which data delivery has been successful is reported from the secondary base station 200 to the master base station 100 as information on data communication quality (step S200). The control unit 14 of the master base station 100 calculates an error rate in accordance with the number of sequence numbers for which data delivery has been successful, which is reported from the secondary base station 200. Then, the control unit 14 of the master base station 100 determines whether the error rate is larger than the configured error rate $10^{-5}$. The error rate and the configured error rate $10^{-5}$ correspond to the number of failures N and the configured number of failures Nth of FIG. 12, respectively (step S201). When the error rate is equal to or less than the configured error rate $10^{-5}$ (No at step S201), the control unit 14 of the master base station 100 controls the communication unit 11 to deliver data, which is addressed to the user equipment 300, to the secondary base station 200 (step S203). On the other hand, when the error rate is larger than the configured error rate $10^{-5}$ (Yes at step S201), the control unit 14 of the master base station 100 controls the communication unit 11 so as to avoid the delivery of the data addressed to the user equipment 300 (step S202).

As described above, in the wireless communication system according to the second embodiment, the master base station 100 considers the error rate from the information on the communication quality of data (the number of sequence numbers for which data delivery has been successful), so that it is possible to realize reliable data delivery.

Furthermore, in the second embodiment, the master base station 100 controls data delivery in accordance with the information on the communication quality of data (F-PDCP SN), which is delivered from the secondary base station 200 to the user equipment 300, but these are not limitative. The master base station 100 may further control data delivery in accordance with, for example, a resource utilization rate of the secondary base station 200 as information on radio resources of the secondary base station 200.

In DC for URLLC, since it is important whether it is possible to realize reliable data delivery, when a traffic load on the secondary base station 200 is high, scheduling in the secondary base station 200 may be difficult. In such a case, in FIG. 10, the control unit 24 of the secondary base station 200 monitors the resource utilization rate in the communication unit 21. Then, the control unit 24 of the secondary base station 200 controls the communication unit 21 to report the monitored resource utilization rate to the master base station 100, in addition to the information on the communication quality (F-PDCP SN). In such a case, as illustrated in FIG. 14, the packet reported from the secondary base station 200 to the master base station 100 includes information indicating the resource utilization rate, in addition to the information on the communication quality (F-PDCP SN).

Such a case will be described using FIG. 12. First, the information on the communication quality (F-PDCP SN) is reported from the secondary base station 200 to the master base station 100. Furthermore, the resource utilization rate of the secondary base station 200 is reported from the secondary base station 200 to the master base station 100 (step S200). The control unit 14 of the master base station 100 calculates an error rate in accordance with the information on the communication quality (F-PDCP SN) reported from the secondary base station 200. Then, the control unit 14 of the master base station 100 determines whether the error rate is larger than the configured error rate $10^{-5}$. The error rate and the configured error rate $10^{-5}$ correspond to the number of failures N and the configured number of failures Nth of FIG. 12, respectively. Furthermore, the control unit 14 of the master base station 100 determines whether the resource utilization rate of the secondary base station 200 is larger than a set resource utilization rate. The resource utilization rate and the set resource utilization rate correspond to the number of failures N and the configured number of failures Nth of FIG. 12, respectively (step S201). Here, the error rate is equal to or less than the configured error rate $10^{-5}$ and the resource utilization rate is equal to or less than the set resource utilization rate (No at step S201). In such a case, the control unit 14 of the master base station 100 controls the communication unit 11 to deliver data, which is addressed to the user equipment 300, to the secondary base station 200 (step S203). On the other hand, the error rate is larger than the configured error rate $10^{-5}$ or the resource utilization rate is larger than the set resource utilization rate (Yes at step S201). In such a case, the control unit 14 of the master base station 100 controls the communication unit 11 so as to avoid the delivery of the data addressed to the user equipment 300 (step S202).

As described above, in the wireless communication system according to the second embodiment, the master base station 100 considers the information on the communication quality of data (F-PDCP SN) and the information on radio resources (resource utilization rate), so that it is possible to realize reliable data delivery.

Furthermore, in the second embodiment, the master base station 100 controls data delivery in accordance with the information on the communication quality of data (F-PDCP SN), which is delivered from the secondary base station 200 to the user equipment 300, but these are not limitative. The master base station 100 may further control data delivery in accordance with, for example, a latency permitted in URLLC as information on delay.

In such a case, in FIG. 10, the control unit 14 of the master base station 100 monitors a latency when the communication unit 11 transmits data to the secondary base station 200. The monitored latency is, for example, a time from the start of data transmission to the secondary base station 200 (initial transmission of data) to the reception of data acknowledge (ACK) from the secondary base station 200, a time from data retransmission to the reception of ACK from the secondary base station 200, and the like. In such a case, as illustrated in FIG. 15, the packet reported from the secondary base station 200 to the master base station 100 includes information indicating the latency, in addition to the information on the communication quality (F-PDCP SN (or error rate)).

Alternatively, in FIG. 10, the control unit 24 of the secondary base station 200 monitors a latency when the communication unit 21 transmits data to the user equipment 300. The monitored latency is, for example, a time from the initial transmission of data to the user equipment 300 to the reception of ACK from the user equipment 300, a time from data retransmission to the reception of ACK from the user equipment 300, and the like. Then, the control unit 24 of the secondary base station 200 controls the communication unit 21 to report the monitored latency to the master base station 100 in addition to the information on the communication quality (F-PDCP SN). In such a case, as illustrated in FIG. 15, the packet reported from the secondary base station 200 to the master base station 100 includes information indicating the latency, in addition to the information on the communication quality (F-PDCP SN (or error rate)).

Such a case will be described using FIG. 12. First, the information on the communication quality (F-PDCP SN) is reported from the secondary base station 200 to the master base station 100. Furthermore, the master base station 100 monitors a latency when transmitting data to the secondary base station 200. Alternatively, a latency when the secondary base station 200 transmits data to the user equipment 300 is reported from the secondary base station 200 to the master base station 100 (step S200). The control unit 14 of the master base station 100 calculates an error rate in accordance with the information on the communication quality (F-PDCP SN) reported from the secondary base station 200. Then, the control unit 14 of the master base station 100 determines whether the error rate is larger than the configured error rate $10^{-5}$. The error rate and the configured error rate $10^{-5}$ correspond to the number of failures N and the configured number of failures Nth of FIG. 12, respectively. Furthermore, the control unit 14 of the master base station 100 determines whether the latency permitted in URLLC is larger than a configured latency. The latency and the configured latency correspond to the number of failures N and the configured number of failures Nth of FIG. 12, respectively (step S201). Here, in DC for URLLC, since it is important whether it is possible to realize reliable data delivery, 1 ms is assumed as the configured latency in a radio access network (RAN), for example. Here, the error rate is equal to or less than the configured error rate $10^{-5}$ and the latency is equal to or less than the configured latency (No at step S201). In such a case, the control unit 14 of the master base station 100 controls the communication unit 11 to deliver data, which is addressed to the user equipment 300, to the secondary base station 200 (step S203). On the other hand, the error rate is larger than the configured error rate $10^{-5}$ or the latency is larger than the configured latency (Yes at step S201). In such a case, the control unit 14 of the master base station 100 controls the communication unit 11 so as to avoid the delivery of the data addressed to the user equipment 300 (step S202).

As described above, in the wireless communication system according to the second embodiment, the master base station 100 considers the information on the communication quality of data (F-PDCP SN) and the information on latency (delay time), so that it is possible to realize reliable data delivery.

Furthermore, in the wireless communication system according to the second embodiment, in addition to the information on the communication quality of data (F-PDCP SN (error rate)), the information on the radio resources (resource utilization rate) and the information on the latency (delay time) may be combined. In such a case, as illustrated in FIG. 16, the packet reported from the secondary base station 200 to the master base station 100 includes information indicating the resource utilization rate and the latency, in addition to the information on the communication quality (F-PDCP SN (or error rate)).

For example, the error rate is equal to or less than the configured error rate $10^{-5}$, the resource utilization rate is equal to or less than the set resource utilization rate, and the latency is equal to or less than the configured latency (No at step S201). In such a case, the control unit 14 of the master base station 100 controls the communication unit 11 to deliver data, which is addressed to the user equipment 300, to the secondary base station 200 (step S203). On the other hand, the error rate is larger than the configured error rate $10^{-5}$, the resource utilization rate is larger than the set resource utilization rate, or the latency is larger than the configured latency (Yes at step S201). In such a case, the control unit 14 of the master base station 100 controls the communication unit 11 so as to avoid the delivery of the data addressed to the user equipment 300 (step S202).

As described above, in the wireless communication system according to the second embodiment, when the master base station 100 combines the information on the communication quality of data, the information on the radio resources, and the information on the delay, it is possible to realize more reliable data delivery.

In DC for URLLC, in order to realize reliable data delivery, it is important to prevent unnecessary data delivery. In each node of the master base station 100 and the secondary base station 200, x and y are assumed to be the probabilities that it is not possible to satisfy the requirements of URLLC. For example, in general DC data delivery, the probability that it is not possible to satisfy the configured error rate $10^{-5}$ is represented by $x \times y + x \times (1-y) + (1-x) \times y = x + y - (x \times y)$. Furthermore, in the DC data delivery in the wireless communication system according to the second embodiment, the probability that it is not possible to satisfy the configured error rate $10^{-5}$ is represented by $x \times y$. Therefore, when assuming the configured latency (1 ms) of RAN, assuming that an error rate at the time of initial transmission is $10^{-2}$, and assuming that the number of data retransmissions is 1, the probabilities x and y that it is not possible to satisfy the requirements of URLLC are assumed to $10^{-4}$. In such a case, the probability that it is not possible to satisfy the configured error rate $10^{-5}$ is represented by $0.2 \times 10^{-5}$ in the general DC data delivery and is represented by $0.1 \times 10^{-7}$ in the DC data delivery in the wireless communication system according to the second embodiment. Consequently, in accordance with the DC data delivery in the wireless communication system according to the second embodiment, the probability that it is possible to prevent unnecessary data delivery is twice or more as large as that in the general DC data delivery.

In the wireless communication system according to the second embodiment, in addition to the information on the communication quality of data (F-PDCP SN (error rate)), the resource utilization rate, the latency, and a data retention amount of the entire user equipment 300 (UE) may be combined. In such a case, as illustrated in FIG. 17, the packet reported from the secondary base station 200 to the master base station 100 includes information indicating the resource utilization rate, the latency, and the data retention amount of the entire UE, in addition to the F-PDCP SN (or error rate). The reason why the data retention amount of the entire UE is also reported is because it is also important to reduce buffering delay in order to reduce the latency of URLLC.

Furthermore, in the wireless communication system according to the second embodiment, the combinations illustrated in FIG. 14 to FIG. 17 have been described as examples; however, these are not limitative. When combined with the information on the communication quality of data (F-PDCP SN or error rate), any of the resource utilization rate, the latency, and the data retention amount of the entire UE may be combined, in addition to the information on the communication quality of data.

Other Embodiments

Each component in the embodiments does not always need to be physically configured as illustrated in the drawings. That is, the specific form of distribution and/or integration of each unit is not limited to the drawings, and all or some thereof can be functionally or physically distributed and/or integrated in any unit depending on the various loads, usage conditions, or the like.

Moreover, all or any part of various processings performed by each device may be performed on a central processing unit (CPU) (or a microcomputer such as a micro processing unit (MPU) and a micro controller unit (MCU). Furthermore, all or any part of various processings may be performed on a computer program analyzed and executed by the CPU (or the microcomputer such as the MPU and the MCU) or wired logic-based hardware.

The master base station 100, the secondary base station 200, and the user equipment 300 can be realized by, for example, the following hardware configurations.

Figure 18:
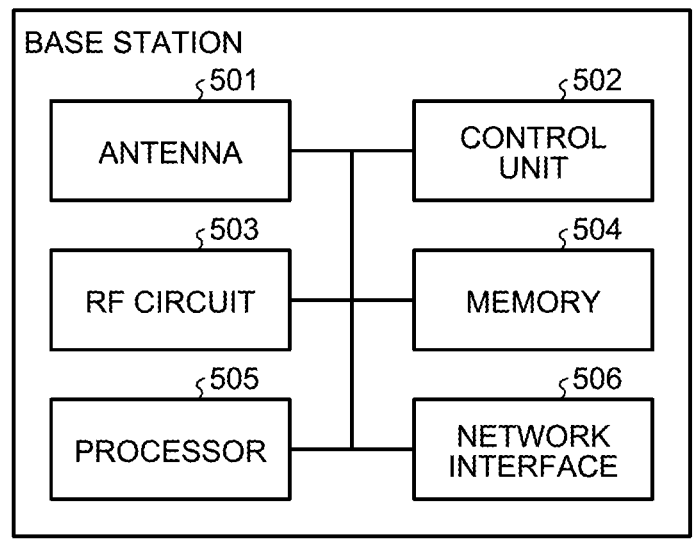
FIG. 18 is a block diagram illustrating an example of a hardware configuration of a base station.

FIG. 18 is a block diagram illustrating an example of a hardware configuration of a base station. The base station illustrated in FIG. 18 corresponds to, for example, the master base station 100 and the secondary base station 200, and has an antenna 501, a control unit 502, a radio frequency (RF) circuit 503, a memory 504, a processor 505, and a network interface 506.

The control unit 502 performs, for example, the functions of the control unit 14 of the master base station 100 and the control unit 24 of the secondary base station 200.

The network interface 506 is an interface for connecting to another base station by wired connection. For example, the master base station 100 and the secondary base station 200 are connected to each other in a wired manner via the network interface 506.

The processor 505, the memory 504, and the RF circuit 503 perform, for example, the functions of the communication unit 11 of the master base station 100 and the communication unit 21 of the secondary base station 200.

An example of the processor 505 includes a CPU, a digital signal processor (DSP), a field programmable gate array (FPGA) and the like. An example of the memory 504 includes a random access memory (RAM) such as a synchronous dynamic random access memory (SDRAM), a read only memory (ROM), a flash memory and the like. For example, the memory 504 stores various computer programs such as computer programs for performing the functions of the communication unit 11 or the communication unit 21. The processor 505 reads the computer programs stored in the memory 504 and cooperates with the RF circuit 503 and the like, thereby performing the functions of the communication unit 11 or the communication unit 21.

Note that the various processings performed in the base station of the embodiments are performed by one processor herein; however, these are not limitative, and the processings may be performed by a plurality of processors.

Figure 19:
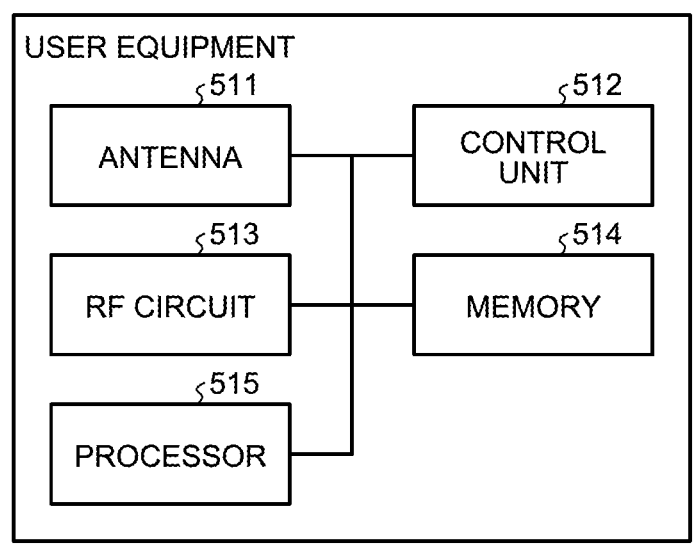
FIG. 19 is a block diagram illustrating an example of a hardware configuration of a user equipment.

FIG. 19 is a block diagram illustrating an example of a hardware configuration of a user equipment. The user equipment illustrated in FIG. 19 corresponds to, for example, the user equipment 300, and has an antenna 511, a control unit 512, an RF circuit 513, a memory 514, and a processor 515.

The control unit 512 performs, for example, the functions of the control unit 34 of user equipment 300.

The processor 515, the memory 514, and the RF circuit 513 perform, for example, the functions of the communication unit 31 of the user equipment 300. An example of the processor 515 includes a CPU, a DSP, a FPGA, and the like. An example of the memory 514 includes a RAM such as a SDRAM, a ROM, a flash memory, and the like. For example, the memory 514 stores various computer programs such as computer programs for performing the functions of the communication unit 31. The processor 515 reads the computer programs stored in the memory 514 and cooperates with the RF circuit 513 and the like, thereby performing the functions of the communication unit 31.

Note that the various processings performed in the user equipment of the embodiments are performed by one processor herein; however, these are not limitative, and the processings may be performed by a plurality of processors.

In one aspect, it is possible to realize reliable data delivery.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
a first wireless communication device; and
a second wireless communication device, wherein
the first wireless communication device comprises:
a communicator that delivers, to the second wireless communication device, data addressed to a third wireless communication device and receives, from the second wireless communication device, information on communication quality according to failed data of which delivery fails among the data delivered from the second wireless communication device to the third wireless communication device, the information used in a Packet Data Convergence Protocol (PDCP) layer; and
a controller that controls delivery of the data from the first wireless communication device to the second wireless communication device in accordance with the information on the communication quality, wherein
the controller controls, in the PDCP layer, the delivery of the data from the first wireless communication device to the second wireless communication device, in accordance with information on error rate that is used in a lower layer of the PDCP layer and relates to the information on the communication quality.

2. The wireless communication system according to claim 1, wherein the information on the communication quality represents information on sequence number for the failed data.

3. The wireless communication system according to claim 1, wherein the information on the communication quality represents a number of failed deliveries of the data or a number of successful deliveries of the data.

4. The wireless communication system according to claim 2, wherein
the communicator assigns, to the data addressed to the third wireless communication device, identifiers indicating an order of the delivery of the data, and
the information on the communication quality represents a number of identifiers in which the delivery of the data fails or a number of identifiers in which the delivery of the data is successful.

5. The wireless communication system according to claim 1, wherein the controller further controls the delivery of the data in accordance with information on a radio resource of the second wireless communication device.

6. The wireless communication system according to claim 1, wherein the controller further controls the delivery of the data in accordance with information on latency.

7. A base station comprising:
a communicator that delivers data to a user equipment via another base station and receives, from the other base station, information on communication quality according to failed data of which delivery fails among the data delivered from the other base station to the user equipment, the information used in a Packet Data Convergence Protocol (PDCP) layer; and
a controller that controls delivery of the data from the base station to the other base station in accordance with the information on the communication quality, wherein
the controller controls, in the PDCP layer, the delivery of the data from the base station to the other base station, in accordance with information on error rate that is used in a lower layer of the PDCP layer and relates to the information on the communication quality.

8. A base station comprising:
a communicator transmits, to a user equipment, data delivered from another base station; and
a controller that reports, to the other base station, information on communication quality according to failed data of which delivery fails among the data delivered to the user equipment, the information used in a Packet Data Convergence Protocol (PDCP) layer, wherein
delivery of the data from the other base station to the base station by the other base station is controlled in the PDCP layer in accordance with information on error rate that is used in a lower layer of the PDCP layer and relates to the information on the communication quality.

9. A user equipment comprising:
a communicator that receives data delivered from a first wireless communication device via a second wireless communication device; and
a controller that reports information on reception of the data to the second wireless communication device, wherein
information on communication quality according to failed data of which delivery fails among the data delivered from the second wireless communication device to the user equipment is reported from the second wireless communication device to the first wireless communication device in accordance with the information on the reception of the data, the information used in a Packet Data Convergence Protocol (PDCP) layer; and delivery of the data from the first wireless communication device to the second wireless communication device is controlled in the (PDCP) PDCP layer in accordance with information on error rate that is used in a lower layer of the PDCP layer and relates to the information on the communication quality.

* * * * *